United States Patent
Fukunaga et al.

(10) Patent No.: US 7,948,200 B2
(45) Date of Patent: May 24, 2011

(54) MOTOR DRIVE DEVICE, IMAGE READING DEVICE, IMAGE FORMING APPARATUS, AND MOTOR DRIVE METHOD

(75) Inventors: Yasuyuki Fukunaga, Kanagawa (JP);
Masatake Ohmori, Kanagawa (JP);
Mitsuo Shinya, Kanagawa (JP);
Hirokazu Goto, Kanagawa (JP);
Toshiaki Nomura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 438 days.

(21) Appl. No.: 12/036,827

(22) Filed: Feb. 25, 2008

(65) Prior Publication Data
US 2008/0278107 A1   Nov. 13, 2008

(30) Foreign Application Priority Data

Mar. 14, 2007   (JP) .................. 2007-064814
Dec. 21, 2007   (JP) .................. 2007-330029

(51) Int. Cl.
*G05B 19/40* (2006.01)
(52) U.S. Cl. ....................... 318/685; 318/696
(58) Field of Classification Search .......... 318/560, 318/599, 652, 696, 685; 396/244, 256, 260; 360/78.13
See application file for complete search history.

(56) References Cited

U.S. PATENT DOCUMENTS

| | | | | |
|---|---|---|---|---|
| 4,697,129 A * | 9/1987 | Enami et al. | ........ | 318/696 |
| 5,594,311 A * | 1/1997 | Yasuda et al. | ........ | 318/685 |
| 5,825,151 A * | 10/1998 | Ikawa et al. | ........ | 318/685 |
| 5,844,394 A * | 12/1998 | Mushika et al. | ........ | 318/696 |
| 6,850,028 B2 * | 2/2005 | Yoshihisa et al. | ........ | 318/696 |
| 6,879,415 B2 * | 4/2005 | Kurosawa | ........ | 358/474 |
| 7,019,475 B2 * | 3/2006 | Nireki | ........ | 318/272 |
| 7,439,701 B2 * | 10/2008 | Torikoshi | ........ | 318/685 |
| 7,560,892 B2 * | 7/2009 | Shibasaki et al. | ........ | 318/685 |
| 7,574,126 B2 * | 8/2009 | Honjo et al. | ........ | 396/97 |
| 2003/0193611 A1 * | 10/2003 | Yoshimura | ........ | 348/374 |
| 2007/0047406 A1 * | 3/2007 | Yamashita et al. | ........ | 369/47.38 |

FOREIGN PATENT DOCUMENTS

| | | |
|---|---|---|
| JP | 2002-272185 | 9/2002 |
| JP | 2004-140890 | 5/2004 |
| JP | 2005-73474 | 3/2005 |

* cited by examiner

*Primary Examiner* — Walter Benson
*Assistant Examiner* — Antony M Paul
(74) *Attorney, Agent, or Firm* — Oblon, Spivak, McClelland, Maier & Neustadt, L.L.P.

(57) ABSTRACT

A motor drive device drives a stepping motor having a rotor mounted on a rotating shaft with a capability of making a transition between a plurality of excitation modes. A motor control unit drives the stepping motor by controlling the rotor to move to a position corresponding to an excitation modes. A stop control unit controls, when stopping the stepping motor, a stop of the rotor at a position to which the rotor is moved by the motor control unit common to the excitation modes after the stop of the rotor is issued.

12 Claims, 23 Drawing Sheets

FIG. 3

| ADDRESS | EXCITATION MODE | | |
|---|---|---|---|
| | 2 PHASE | 1-2 PHASE | W1-2 PHASE |
| 0 | ○ | ○ | ○ |
| 1 | | | ○ |
| 2 | | ○ | ○ |
| 3 | | | ○ |
| 4 | ○ | ○ | ○ |
| 5 | | | ○ |
| 6 | | ○ | ○ |
| 7 | | | ○ |
| 8 | ○ | ○ | ○ |
| 9 | | | ○ |
| 10 | | ○ | ○ |
| 11 | | | ○ |
| 12 | ○ | ○ | ○ |
| 13 | | | ○ |
| 14 | | ○ | ○ |
| 15 | | | ○ |

FIG. 4

| ADDRESS | MOTOR DRIVER CONTROL PATTERN (bit [x:0]) |
|---|---|
| 0 | TABLE 0 |
| 1 | TABLE 1 |
| 2 | TABLE 2 |
| 3 | TABLE 3 |
| 4 | TABLE 4 |
| 5 | TABLE 5 |
| 6 | TABLE 6 |
| 7 | TABLE 7 |
| 8 | TABLE 8 |
| 9 | TABLE 9 |
| 10 | TABLE 10 |
| 11 | TABLE 11 |
| 12 | TABLE 12 |
| 13 | TABLE 13 |
| 14 | TABLE 14 |
| 15 | TABLE 15 |

FIG. 5

| DIRECTION OF ROTATION | EXCITATION MODE | NUMBER OF REPETITION | NUMBER OF PULSE |
|---|---|---|---|
| ⋮ | ⋮ | ⋮ | ⋮ |
| FORWARD ROTATION | W1-2 PHASE | ONCE | XX |
| ⋮ | ⋮ | ⋮ | ⋮ |
| STOPPED | NONE | NONE | XX |
| ⋮ | ⋮ | ⋮ | ⋮ |
| REVERSE ROTATION | 2 PHASE | TWICE | XX |
| ⋮ | ⋮ | ⋮ | ⋮ |

FIG. 7

| DIRECTION OF ROTATION | EXCITATION MODE | NUMBER OF REPETITION |
|---|---|---|
| FORWARD ROTATION | W1-2 PHASE | ONCE |
| REVERSE ROTATION | 1-2 PHASE | TWICE |
| | 2 PHASE | THREE TIMES |
| | | FOUR TIMES |

FIG. 10

ADDRESS CONTROL FOR CASE OF:
DIRECTION OF ROTATION: FORWARD ROTATION,
EXCITATION MODE: 2 PHASE, REPEAT NUMBER: ONCE

| ADDRESS | MOTOR DRIVER CONTROL PATTERN | | | | | |
|---|---|---|---|---|---|---|
| | bit 5 | bit 4 | bit 3 | bit 2 | bit 1 | bit 0 |
| 0 | TABLE 0 | | | | | |
| 1 | TABLE 1 | | | | | |
| 2 | TABLE 2 | | | | | |
| 3 | TABLE 3 | | | | | |
| 4 | TABLE 4 | | | | | |
| 5 | TABLE 5 | | | | | |
| 6 | TABLE 6 | | | | | |
| 7 | TABLE 7 | | | | | |
| 8 | TABLE 8 | | | | | |
| 9 | TABLE 9 | | | | | |
| 10 | TABLE 10 | | | | | |
| 11 | TABLE 11 | | | | | |
| 12 | TABLE 12 | | | | | |
| 13 | TABLE 13 | | | | | |
| 14 | TABLE 14 | | | | | |
| 15 | TABLE 15 | | | | | |

FIG. 16

| NEXT ADDRESS DESIGNATING METHOD | ADD/ SUBTRACT ADDRESS VALUE | STOP EXCITATION MODE | STOP POSITION | STOP DIRECTION |
|---|---|---|---|---|
| FIXED | [NUMERIC VALUE] | 2 PHASE | [POSITION SPECIFIED] | FORWARD ROTATION |
| SPECIFIED | ⋮ | 1-2 PHASE | | REVERSE ROTATION |
| | | W1-2 PHASE | | |
| | [NUMERIC VALUE] | SPECIFIED YES/NO | | |

SETTING WHEN SPECIFICATION PRESENT

STOP DIRECTION WITH RESPECT TO DIRECTION OF ROTATION

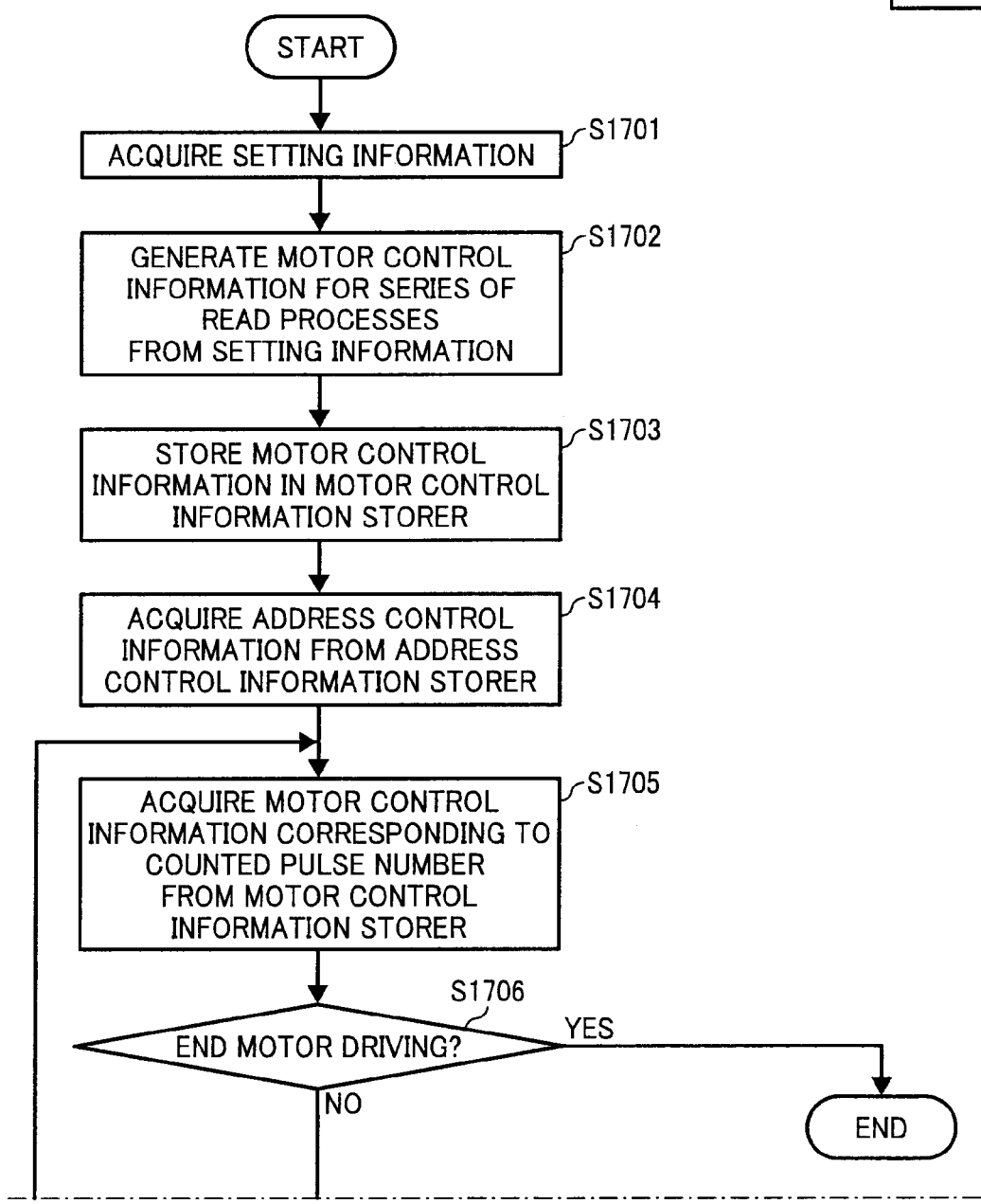

FIG. 20

| ADDRESS | OPERATION EXCITATION MODE | STOP EXCITATION MODE |
| --- | --- | --- |
| | W1-2 | 2 PHASE |
| 0 | O | O |
| 1 | O | |
| 2 | O | |
| 3 | O | |
| 4 | O | O |
| 5 | O | |
| 6 | O | |
| 7 | O | |
| 8 | O | O |
| 9 | O | |
| 10 | O | |
| 11 | O | |
| 12 | O | O |
| 13 | O | |
| 14 | O | |
| 15 | O | |

INTERNAL STOPPING
(STOP INSTRUCTION FLAG)

↓ STOP CONTROL OPERATION

↓ STOP CONTROL OPERATION

● STOPPING
(STOP POSITION FLAG)

MOTOR DRIVE DEVICE, IMAGE READING DEVICE, IMAGE FORMING APPARATUS, AND MOTOR DRIVE METHOD

CROSS-REFERENCE TO RELATED APPLICATIONS

The present application claims priority to and incorporates by reference the entire contents of Japanese priority documents 2007-064814 filed in Japan on Mar. 14, 2007 and 2007-330029 filed in Japan on Dec. 21, 2007.

BACKGROUND OF THE INVENTION

1. Field of the Invention

The present invention relates to a motor drive device, an image reading device, an image forming apparatus, and a motor drive method, and particularly, to a motor stopping control.

2. Description of the Related Art

It is well-known that it is typical for stepping motors to be employed as drive devices when an image reading device such as a scanner drives an image sensor unit and reads in an original document. A stepping motor is capable of controlling rotational speed using a number of excitation modes. However, when stopping positions in two excitation modes do not match while rotation of the stepping motor changes from one excitation mode to another excitation mode, the position of the rotor becomes indeterminate and images that are read in can become distorted.

In order to resolve such problems, such a motor drive device that smoothly makes a transition between two excitation modes during driving has been disclosed in Japanese Patent Application Laid-open No. 2004-140890. This motor drive device ensures that the position of the rotor does not become indeterminate in the transition to the next excitation mode. This is achieved by determining, during transition from one excitation mode to another excitation mode, that the rotor moves to a position common to the two excitation modes, and then making a transition.

However, with the technology disclosed in patent document 1, when temporarily stopping the stepping motor and starting operation in an excitation mode different to the excitation mode during stopping, the operation of the rotor becomes indeterminate and distortion of read images occurs when the rotor is not stopped at a position corresponding to the excitation mode operation is to start for.

SUMMARY OF THE INVENTION

It is an object of the present invention to at least partially solve the problems in the conventional technology.

According to an aspect of the present invention, there is provided a motor drive device that drives a stepping motor having a rotor mounted on a rotating shaft with a capability of making a transition between a plurality of excitation modes. The motor drive device includes a motor control unit that drives the stepping motor by controlling the rotor to move to a position corresponding to an excitation modes; and a stop control unit that controls, when stopping the stepping motor, a stop of the rotor at a position to which the rotor is moved by the motor control unit common to the excitation modes after the stop of the rotor is issued.

Furthermore, according to another aspect of the present invention, there is provided a motor drive method for driving a stepping motor having a rotor mounted on a rotating shaft with a capability of making a transition between a plurality of excitation modes. The motor drive method includes driving the stepping motor by controlling the rotor to move to a position corresponding to an excitation modes; and controlling, when stopping the stepping motor, a stop of the rotor at a position to which the rotor is moved at the driving common to the excitation modes after the stop of the rotor is issued.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view depicting addresses corresponding to the positions of the stator and addresses for where the rotor is attracted to every excitation mode;

FIG. 4 is a view explaining an example data structure for the control pattern information storer;

FIG. 5 is a view explaining an example data structure for the motor-control-information storing unit;

FIG. 7 is a view explaining an example of values for the rotation direction, excitation mode and repeat number acquired as values for the motor control information;

FIG. 10 is a view of an example of address control processing carried out by the control pattern generator;

FIG. 16 is a view explaining an example data structure for the address control information storer and obtained values;

FIG. 20 is a view of an example of the relationship between the current operation excitation mode and the stop excitation mode;

DETAILED DESCRIPTION OF THE PREFERRED EMBODIMENTS

Exemplary embodiments of the present invention are explained in detail below with reference to the accompanying drawings. The present invention is, however, by no means limited to the embodiments.

The following is an explanation with reference to the appended drawings of a first embodiment of the present invention. The motor drive device of the first embodiment controls a rotor to stop at two phase positions common to a number of excitation modes whatever excitation mode of a number of excitation modes possessed by a stepping motor the rotor is being driven at during stopping of the stepping motor. In this embodiment, an explanation is given of the case of applying a motor drive device to driving of an image reader of an image reading device.

Figure 1:
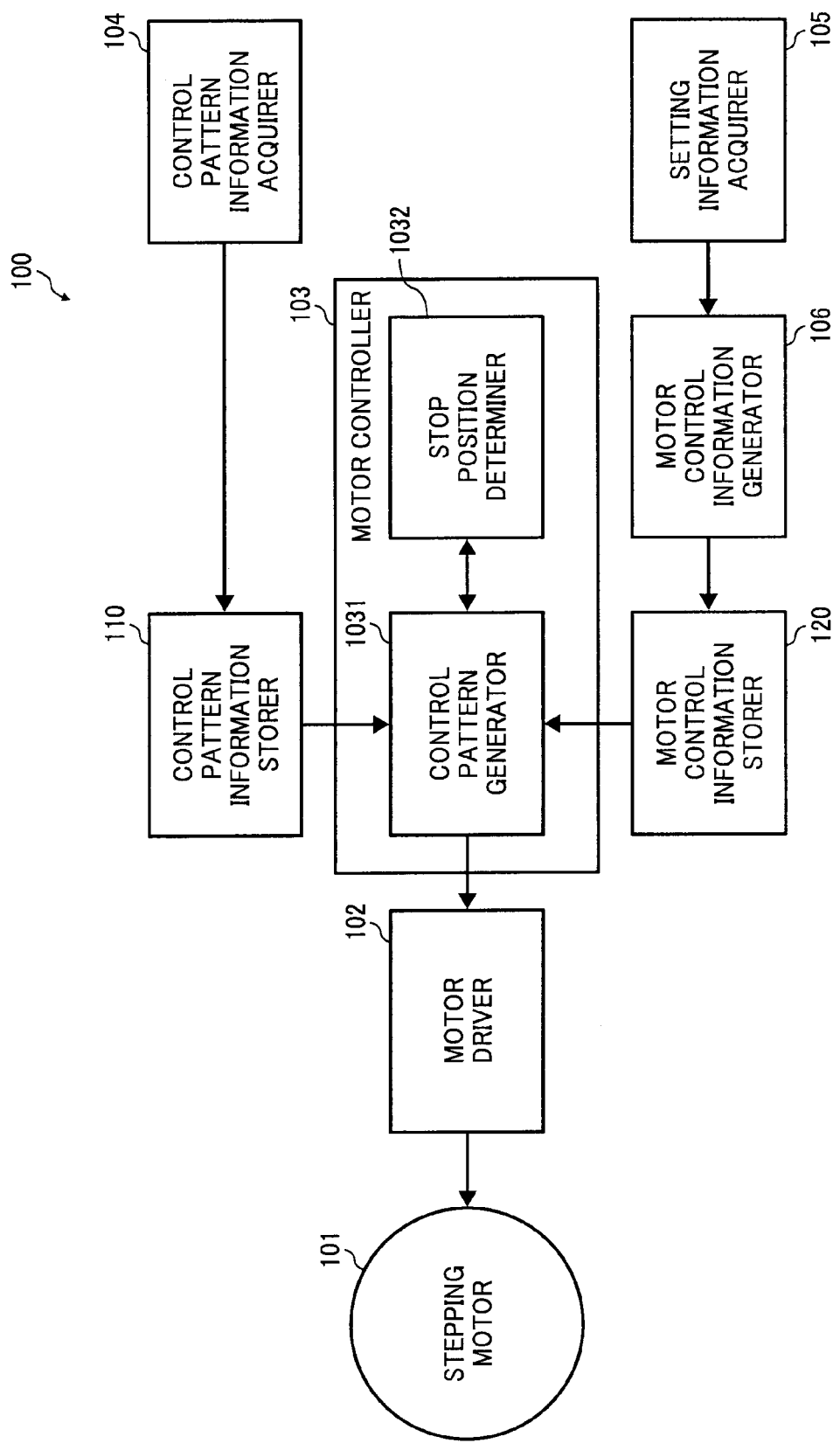
FIG. 1 is a block view of a structure for a motor drive device of a first embodiment.

First, an explanation is given of an example structure for a motor drive device to which the present invention is applied. FIG. 1 is a block view of a structure for a motor drive device of the first embodiment. A motor drive device 100 of this embodiment includes a stepping motor 101, a motor driver 102, a motor controller 103, a control pattern information acquirer 104, a setting information acquirer 105, a motor control information generator 106, a control pattern information storer 110 and a motor control information storer 120.

The stepping motor 101 is made from an electromagnet (stator) fixed at an outer periphery and a magnet (rotor) fitted to a rotating shaft. When a current then flows at the stator, the stator is magnetized, the rotating shaft rotates as a result of pulling of the rotor, and the motor is driven. The motor driver 102 then magnetizes the stator in a manner corresponding to a sent control pattern by converting control patterns (pulse signals) sent in order from the motor controller 103 into a current, and sending the control patterns to the stepping motor 101. The stepping motor 101 is then driven as a result of attraction of the rotor.

The motor controller 103 controls driving of the stepping motor 101 by sending control patterns to the motor driver 102. The motor controller 103 can be any one of either of a control circuit or a program operating on a CPU. When the motor controller 103 is a control circuit, control of the stepping motor 101 is carried out by a control circuit rather than by the CPU. The load on the CPU within the device can therefore be alleviated.

The motor controller 103 includes a control pattern generator 1031 and a stop position determiner 1032. The control pattern generator 1031 is the motor control unit of the present invention. The control pattern generator 1031 and the stop position determiner 1032 are the stop control unit of the present invention.

The control pattern generator 1031 then generates a control pattern (pulse signal) for controlling the stepping motor 101 from control patterns stored in the control pattern information storer 110 in accordance with the transition order of the motor control information stored in the motor control information storer 120 and sends the control pattern to the motor driver 102. This motor control information is information indicating how to control and drive the stepping motor 101 in order to operate the image reader that is generated from information such as the original document size of the image being read in, inputted from an operation unit. The motor control information is generated at the time of reading of the original document by the motor control information generator 106 and stored in the motor control information storer 120.

The control pattern generator 1031 sends a two-phase position flag to the stop position determiner 1032 when it is determined that a control pattern sent to the motor driver 102 is a control pattern that moves the rotor to a position of the stator corresponding to a two-phase excitation mode. "Excitation mode" refers to a type of drive method for during driving of the stepping motor. The stepping motor of this embodiment is taken to be capable of being controlled by three excitation modes of a two-phase excitation mode, a 1-2 phase excitation mode, and a W1-2 phase excitation mode. Next, an explanation is given of positions of the stator that attract the rotor fitted to the rotating shaft as a result of magnetization during driving by the stepping motor 101 in the respective excitation modes of two-phase excitation mode, 1-2 phase excitation mode, and W-1-2 phase excitation mode.

Figure 2:
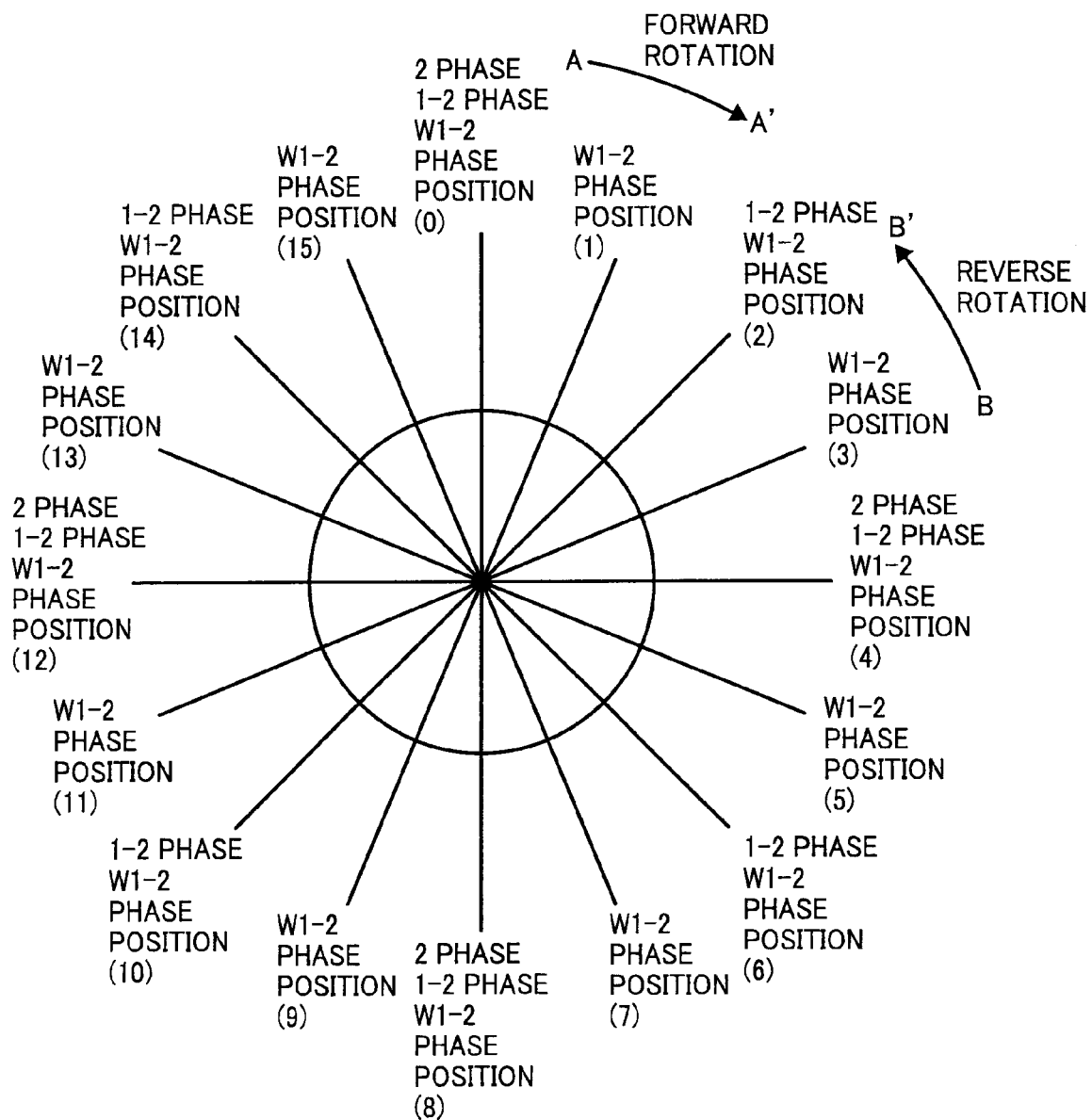
FIG. 2 is a view depicting examples of positions of a stator and positions the rotor moves to in the respective excitation modes at the stepping motor.

FIG. 2 is a view depicting examples of positions of a stator and positions the rotor moves to in the respective excitation modes at the stepping motor. FIG. 3 depicts addresses corresponding to the positions of the stator and addresses for where the rotor is attracted every excitation mode. In FIG. 2, a vertically upward position of the stepping motor is taken to be (0), and stator positions (0) to (15) that divide 360 degrees up into sixteen equal parts are depicted. The stator is excited at positions (0) to (15), and the motor is rotatably driven as a result of attraction of the rotor. The rotation direction of the motor is taken to be forward rotation in the direction A→A', and is taken to be reverse rotation in the direction B →B'. Addresses corresponding to positions the rotor moves to each excitation mode when the stepping motor is driven in the respective excitation modes as shown in FIG. 2 are shown in FIG. 3.

The stepping motor 101 of this embodiment is compatible with the three excitation modes explained above. In the two-phase excitation mode, the rotor is attracted to the stator at positions (0), (4), (8), and (12) and the motor is rotated. In the 1-2-phase excitation mode, the rotor is attracted to the stator at positions (0), (2), (4), (6), (8), (10), (12) and (14) and the motor is rotated. Further, in the W1-2-phase excitation mode, the rotor is attracted in order to all of the stator positions (0) to (15) and the motor is rotated. The positions (0), (4), (8) and (12), i.e. the positions corresponding to the two-phase excitation mode, are positions that are common to the three excitation modes. In other words, when the rotor is stopped at these positions, the positions will be compatible with all of the excitation modes without there being uncertainty over the next operation start position whichever of the three excitation modes the excitation mode that operates next is. Therefore, when the motor operates again after stopping temporarily, the amount of movement of the rotor in order to start movement from the position corresponding to the excitation mode where the rotor restarts operation is fixed and distortion of the read-in image does not occur. High-quality reading of images that do not distort is then possible by stopping at a position corresponding to the two-phase excitation mode when stopping the rotor. The excitation modes are not limited to the three excitation modes explained here and the positions are not limited to the sixteen equally divided positions.

Further, the control pattern generator 1031 sends a stop instruction flag to the stop position determiner 1032 in the event of exerting control so as to stop the stepping motor 101 in accordance with motor control information such as when the image reader finished reading-in an image. The control pattern generator 1031 sends a control pattern for stopping the rotor to the motor driver 102 when a stop position flag is received from the stop position determiner 1032. As a result, the rotor is stopped at a position corresponding to the stop position flag.

When a position flag is received after receiving a stop instruction flag from the control pattern generator 1031, the stop position determiner 1032 determines a position corresponding to the received position flag to be a stop position and sends the stop position flag to the control pattern generator 1031.

The control pattern information storer 110 stores addresses corresponding to the respective stator positions and control patterns that excite the stator corresponding to the addresses. FIG. 4 is a view explaining an example data structure for the control pattern information storer 110. The control pattern information storer 110 stores addresses corresponding to the respective stator positions (0) to (15) and control patterns that excite the stator corresponding to the addresses in a correlated manner. The control patterns are stored at the time of device manufacture. The control pattern information storer 110 is made from a readable/writable memory (RAM).

The control pattern information acquirer 104 acquires control patterns and stores the acquired control patterns in the control pattern information storer 110 in a manner correlated to the addresses. The acquired control patterns are control patterns for the motor driver 102 that corresponds to the stepping motor 101 mounted on the motor drive device. The control pattern information acquirer 104 stores corresponding control patterns in the control pattern information storer 110 at the times decided by the stepping motor 101 mounted on the motor drive device. It is possible to store corresponding control patterns after finishing the design of the motor controller 103 to advance the design of the motor controller 103 even when the specification of the stepping motor 101 is not decided to speed up design of the motor controller 103. It is also possible to make a motor drive device compatible with respective specifications just by overwriting control patterns without having to provide conversion circuits compatible with individual stepping motors even when stepping motors 101 of various specifications are mounted on the motor drive device.

The setting information acquirer 105 acquires information necessary for generating motor control information for the stepping motor 101. For example, motor control information of the rotation direction and excitation mode of the stepping motor 101, a repeat number, and drive time is decided from the paper size and picture quality setting, single-side/both side printing etc. obtained by the operation unit.

The motor control information generator 106 generates motor control information for the stepping motor 101 from setting information acquired by the setting information acquirer 105 in order to read images from original documents and stores the motor control information in the motor control information storer 120.

The motor control information storer 120 stores motor control information generated by the motor control information generator 106. FIG. 5 is a view explaining an example data structure for the motor control information storer 120. The motor control information storer 120 stores the rotation direction of the motor in the operation order of the motor, the excitation mode, the repeat number, and the number of pulses in a correlated manner. Values for "forward rotation", "reverse rotation", and "stopped" etc. shown in FIG. 2 are stored as the rotation direction of the motor. Which excitation modes are compatible with the stepping motor is stored as the excitation modes. The number of times the control pattern information storer 110 is referred to is stored as the repeat number. The number of times a pulse signal corresponding to a control pattern specifying the rotation direction, excitation mode, and repeat number is sent to the stepping motor 101 is stored as the number of pulses. It is then possible to control the driving of the motor for a series of image reading processes using this motor control information.

Figure 6:
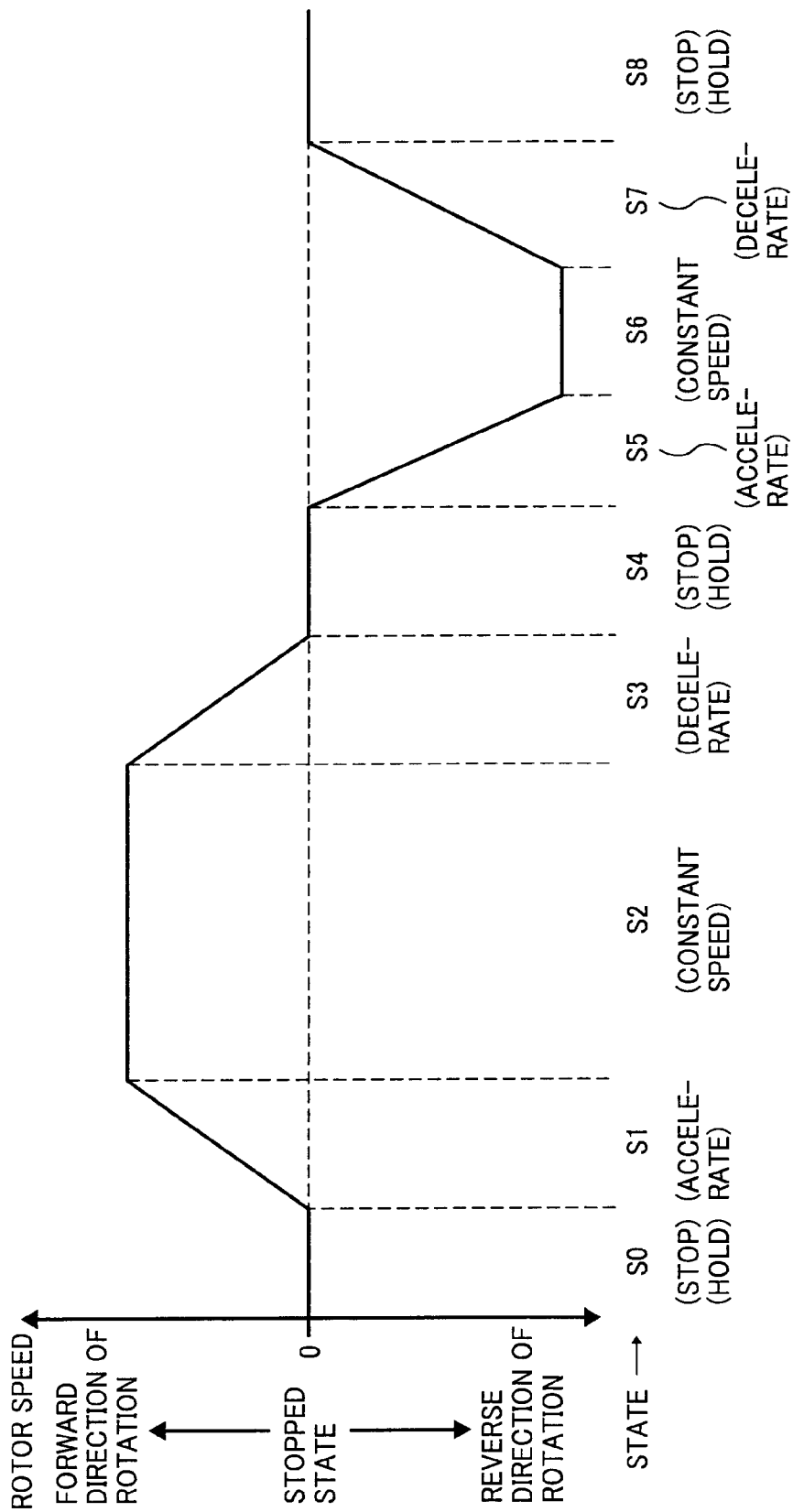
FIG. 6 is a graph explaining an example of motor control information for rotational speed of the rotor and elapsed time.

FIG. 6 is a view explaining an example of motor control information for rotational speed of the rotor and elapsed time. The motor control information of the shape shown in FIG. 5 is stored in advance in the motor control information storer 120 in order to execute driving of the motor as shown in FIG. 6. At the time S0, an initial value is set for the position counter, and is taken as a reference for the position the motor drives to. In a state of acceleration or deceleration (S1, S3, S5, S7), values set in an acceleration/deceleration table (RAM) (not shown) are referred to and the motor is operated.

In this embodiment, an explanation is given of values respectively obtained for the motor control information. FIG. 7 is a view explaining an example of values for the rotation direction, excitation mode and repeat number acquired as values for the motor control information. As shown in FIG. 7, values of "forward rotation" and "reverse rotation" for the rotation direction, values of "W1-2 phase", "1-2 phase", "2 phase" for the excitation mode, and values of "once", "twice", "three times", "four times" for the repeat number can be acquired.

Figure 8:
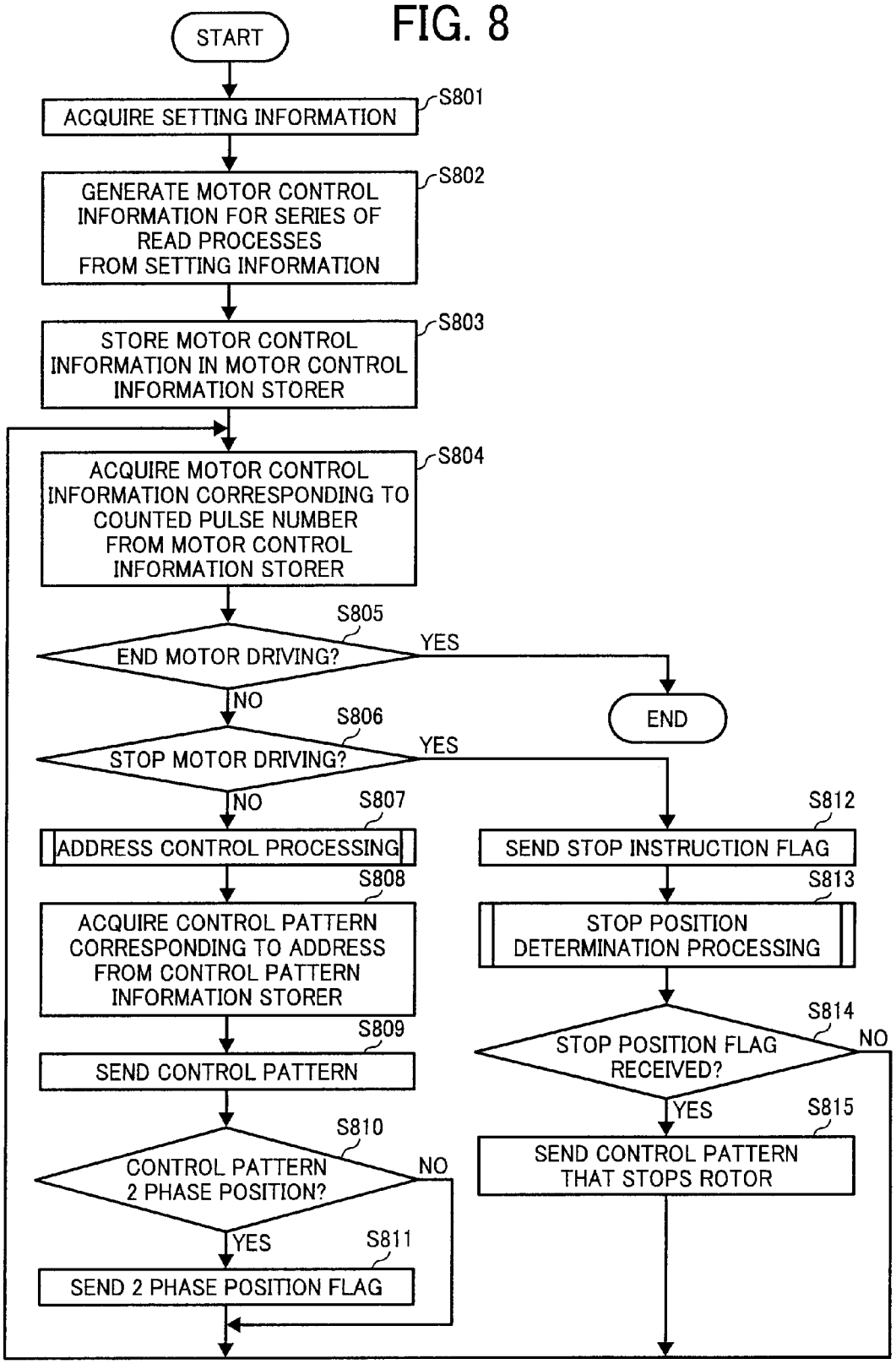
FIG. 8 is a flowchart of a motor drive control processing procedure carried out by the motor control unit.

Next, motor drive control processing by the motor drive device of the above structure is explained. FIG. 8 is a flowchart of a motor drive control processing procedure carried out by the motor control unit. The number of pulses sent to the stepping motor 101 is taken to count the whole of the series of image reading processes.

First, the setting information acquirer 105 acquires setting information inputted from the operation unit (not shown) (Step S801). The motor control information generator 106 then generates motor control information for the series of reading processes from the setting information (Step S802). The motor control information generator 106 stores the generated motor control information in the motor control information storer 120 (Step S803).

The control pattern generator 1031 acquires motor control information corresponding to the number of pulses counted from the motor control information storer 120 (Step S804). Here, the motor control information for the number of pulses counted is motor control information corresponding to the number of pulses counted from the start of operation of the motor, of the motor control information stored in the motor control information storer 120. Specifically, the motor control information is the respective values for the rotation direction, excitation mode, and repeat number where the counted pulse number matches with the total value for the number of pulses of FIG. 5. For example, if the number of pulses counted from the start of driving the motor is 2550, respective values for the rotation direction, excitation mode, and repeat number corresponding to a total number of pulses for the motor control information shown in FIG. 5 of 2550 are acquired.

The control pattern generator 1031 then determines whether the acquired motor control information indicates the end of motor driving (Step S805). When it is determined that the acquired motor control information indicates the end of motor driving (Yes at Step S805), the processing is complete. When it is determined that the acquired motor control information does not indicate that driving of the motor is complete (No at Step S805), the control pattern generator 1031 determines whether or not the acquired motor control information indicates the stopping of motor driving (Step S806). When the acquired motor control information is determined not to indicate the stopping of motor driving (No at Step S806), address control processing is carried out (Step S807). The details of the address control processing are explained later.

Next, the control pattern generator 1031 acquires a control pattern corresponding to the address acquired in the address control processing from the control pattern information storer 110 (Step S808). The control pattern generator 1031 then sends the acquired control pattern to the motor driver 102 (Step S809). As a result, the stepping motor 101 is rotatably driven. Further, the control pattern generator 1031 determines whether the control pattern is a control pattern that controls the rotor to move to a two-phase position (Step S810). Specifically, the control pattern sent to the motor driver 102 and the control pattern corresponding to the two-phase position are compared. When the patterns match, the control pattern is determined to be for controlling the rotor to move to a two-phase position. When the control pattern is determined to be a control pattern that controls the rotor to move to a two-phase position (Yes at Step S810), a two-phase position flag is sent to the stop position determiner 1032 (Step S811). When the control pattern is determined not to be a control pattern that controls the rotor to move to a two-phase position (No at Step S810), Step S804 is returned to.

In Step S806, when the acquired motor control data is determined to indicate stopping of motor driving (Yes at Step S806), a stop instruction flag is sent to the stop position determiner 1032 (Step S812). Stop position determination processing is then carried out (Step S813). The details of the stop position determination processing are explained later. The control pattern generator 1031 determines whether a stop position flag is received from the stop position determiner 1032 (Step S814). When it is determined that a stop position flag is received (Yes at Step S814), a control pattern that stops the rotor is sent (Step S815). As a result, the rotor is stopped at a position corresponding to the two-phase excitation mode. Step S804 is then returned to. When it is determined that a stop position flag is not received (No at Step S814), Step S804 is returned to.

Figure 9:
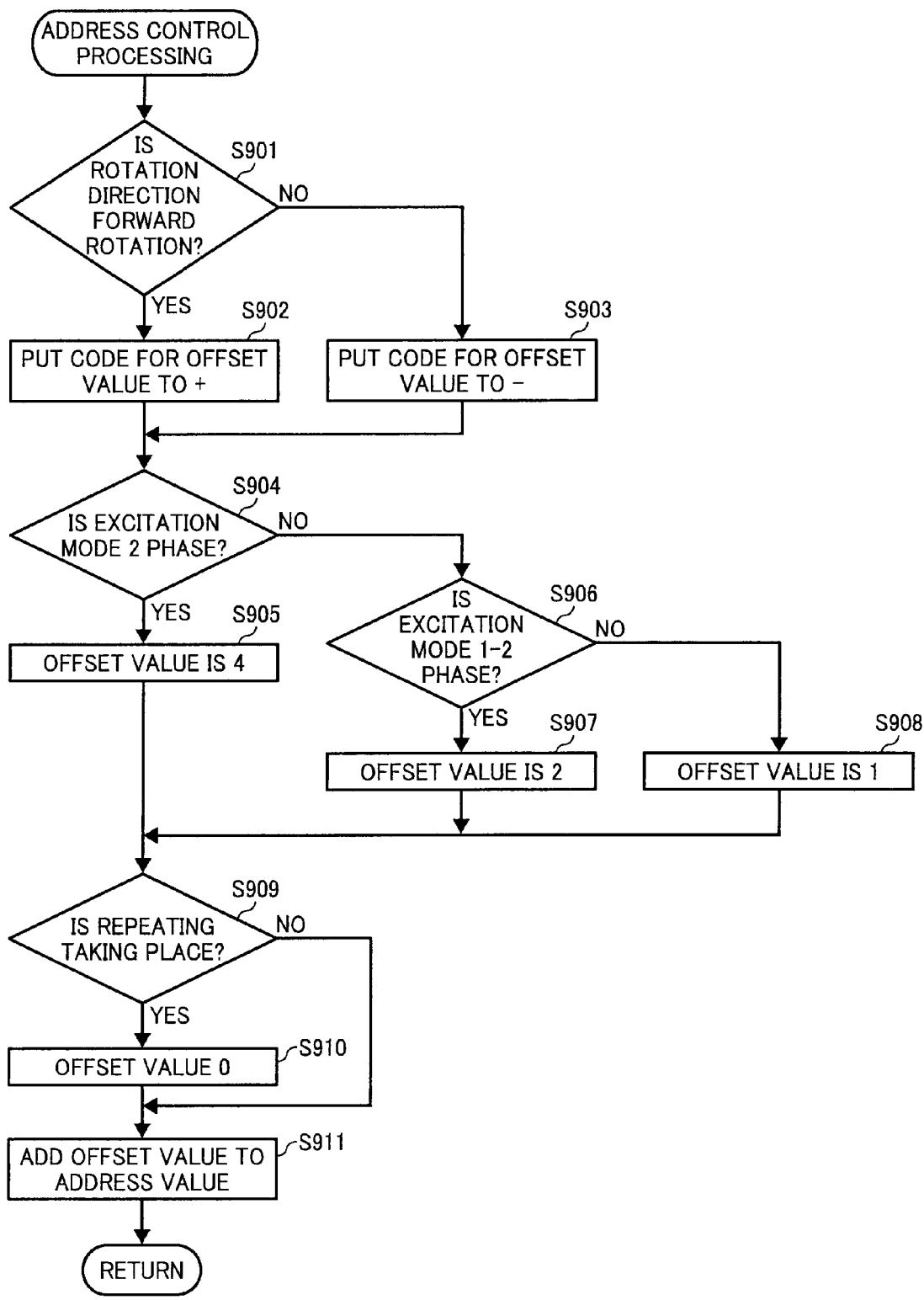
FIG. 9 is a flowchart of an address control processing procedure carried out by the control pattern generator.

Next, address control processing is explained. FIG. 9 is a flowchart of an address control processing procedure carried out by the control pattern generator.

First, the control pattern generator 1031 determines whether the acquired rotation direction is "forward rotation" (Step S901). When it is determined that the acquired rotation direction is "forward rotation" (Yes at Step S901), the code for the offset value is put to "+" (Step S902). When it is determined that the acquired rotation direction is not "forward rotation", i.e. is "reverse rotation" (No at Step S901), the code for the offset value is put to "−" (Step S903).

The control pattern generator 1031 determines whether the acquired excitation mode is "two-phase" (Step S904). When it is determined that the acquired excitation mode is "two-phase" (Yes at Step S904), the offset value is taken to be "4" (Step S905). When it is determined that the acquired excitation mode is not "two phase" (No at Step S904), the control pattern generator 1031 determines whether the acquired excitation mode is "1-2 phase" (Step S906).

When it is determined that the acquired excitation mode is "1-2 phase" (Yes at Step S906), the offset value is taken to be "2" (Step S907). When it is determined that the acquired excitation mode is not "1-2 phase", i.e. is "W1-2 phase" (No at Step S906), the offset value is taken to be "1" (Step S908).

The control pattern generator 1031 determines whether repeating is taking place (Step S909). When it is determined that repeating is taking place (Yes at Step S909), the offset value is taken to be "0". For example, when the repeat number is one of twice, three times, or four times and repeating is taking place, i.e. when the second address is calculated for a repeat number of twice, the offset value is taken to be "0" because the address is made to be the same address as for the first time. As a result, the motor speed is made to be ½ for when the repeat number is one time in order to stop the rotor in the same position.

Similarly, the offset value is made to be "0" because the same address is given as for the first time when addresses are calculated for the second and third time for a repeat number of three times. As a result, the motor speed is made to be ⅓ for when the repeat number is one time because the rotor is stopped in the same position three times. Further, the offset value is made to be "0" because the same address is given as for the first time when addresses are calculated for the second, third, and fourth times for a repeat number of four times. As a result, the motor speed is made to be ¼ for when the repeat number is one time because the rotor is stopped in the same position four times.

In Step S909, Step S911 is processed when it is determined that repeating is not taking place (No at Step S909). The control pattern generator 1031 then adds the offset value to the address value for the previous time and calculates the address value for this time (Step S911).

FIG. 10 is a view of an example of address control processing carried out by the control pattern generator. As shown in FIG. 10, an explanation is given of when the rotation direction is "forward rotation", the excitation mode is "two-phase", and the repeat number is "one time". A control pattern for the address "0" is acquired from the control patterns stored in the control pattern information storer 110, the rotor is attracted to position (0) as a result of sending the control pattern to the motor driver 102 and the motor is rotated. Next, a control pattern for address "4" that is address "0"+4 is acquired, and the rotor is attracted to the position (4) as a result of sending the control pattern to the motor driver 102 so as to be rotated. The motor is therefore rotatably driven at a fixed speed by repeating this process.

The rotor is therefore attracted to the intended position and the motor is rotated as a result of acquiring the control pattern using address control and sending the control pattern to the motor driver 102. The load on the CPU is therefore alleviated.

Further, the address control where the next address is calculated using a bit operation is also possible instead of adding and subtracting the offset value. Address calculations can be carried out more rapidly by calculating the next address by performing bit operations on addresses of four bits.

Figure 11:
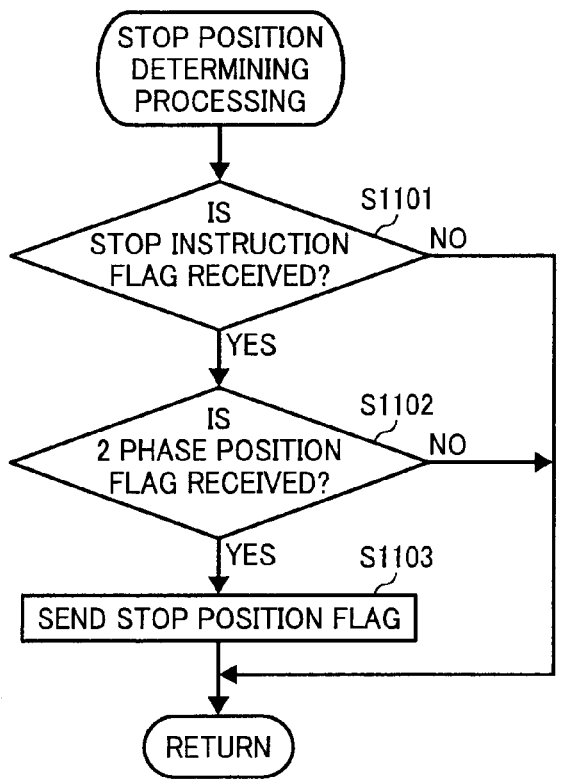
FIG. 11 is a flowchart of a stop position determining processing procedure carried out by the stop position determiner.

Next, stop position determining processing is explained. FIG. 11 is a flowchart of a stop position determining processing procedure carried out by the stop position determiner.

First, the stop position determiner 1032 determines whether a stop instruction flag is received (Step S1101). When it is determined that a stop instruction flag is not received (No at Step S1101), processing ends. When it is determined that a stop instruction flag is received (Yes at Step S1101), it is determined whether a two-phase position flag is received (Step S1102). When it is determined that a two-phase flag is received (Yes at Step S1102), a stop position flag is sent to the control pattern generator 1031 (Step S1103). When it is determined that a two-phase position flag is not received (No at Step S1102), the processing is omitted. As a result, the rotor is not stopped at positions other than positions corresponding to the two-phase excitation mode.

It is then possible to easily determine positions corresponding to the two-phase excitation mode it is intended to stop the rotor at by determining that a two-phase position flag is received after receiving a stop instruction flag.

Figure 12:
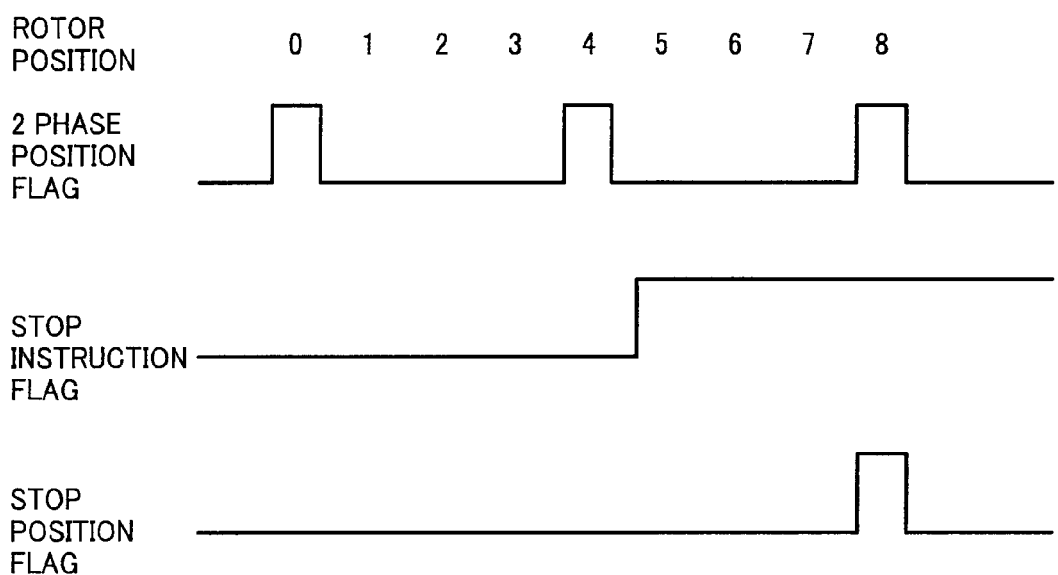
FIG. 12 is a view explaining the relationship between two-phase position flags, stop instruction flags and stop position flags.

FIG. 12 is a view explaining the relationship between two-phase position flags, stop instruction flags and stop position flags. As shown in FIG. 12, the two-phase position flag is sent at positions corresponding to two-phase excitation mode, i.e. positions (0), (4) and (8). The control pattern generator 1031 determines stopping of motor driving and sends a stop instruction flag at position (5). After sending the stop instruction flag, the position sent by the two-phase position flag is the position (8). The stop position flag is therefore sent at position (8).

Figure 13:
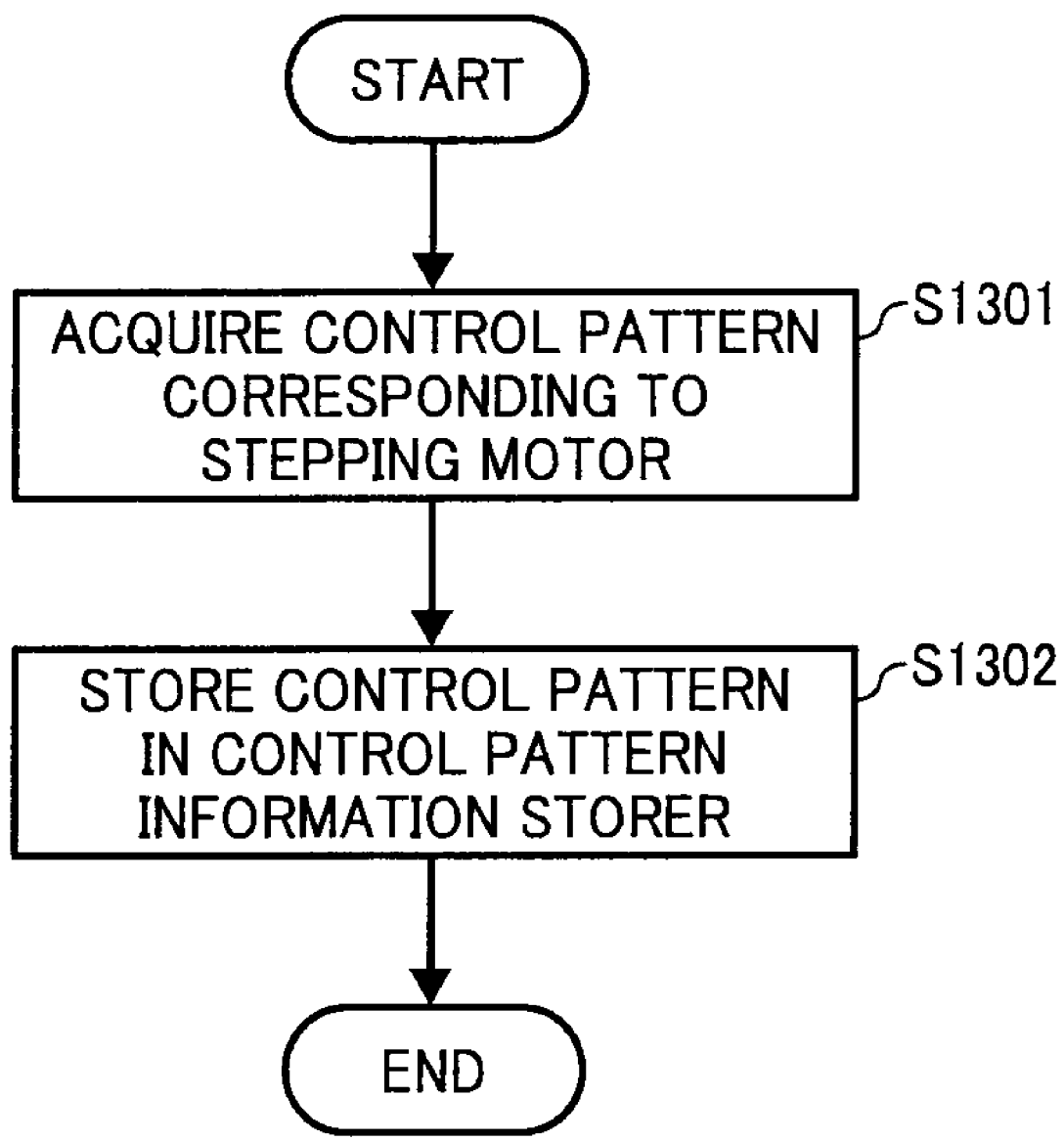
FIG. 13 is a flowchart of a control pattern storage processing procedure carried out by the control pattern information acquirer.

Next, control pattern storage processing is explained. FIG. 13 is a flowchart of a control pattern storage processing procedure carried out by the control pattern information acquirer.

The control pattern information acquirer 104 acquires control patterns corresponding to the stepping motor 101 loaded on the motor drive device (Step S1301). The control pattern information acquirer 104 stores the acquired control patterns in the control pattern information storer 110 in a manner correlating to the addresses (Step S1302).

By storing the control patterns in a freely re-writable manner, control patterns corresponding to the stepping motor mounted in the motor drive device can be stored. It is then possible to control stepping motors using control patterns corresponding to the stepping motor. This means that it is possible to easily provide a structure that controls a motor without the need for conversion circuits to provide compatibility with stepping motors of different specifications.

It is also possible with motor drive devices mounted with stepping motors of different specifications to make motor control units corresponding to stepping motors by storing control patterns corresponding to specifications.

In this embodiment, an explanation is given of a motor drive device mounted on an image reading device but the device the motor drive device is mounted on is by no means limited to an image reading device and application to any device driven by a stepping motor is possible.

Figure 14:
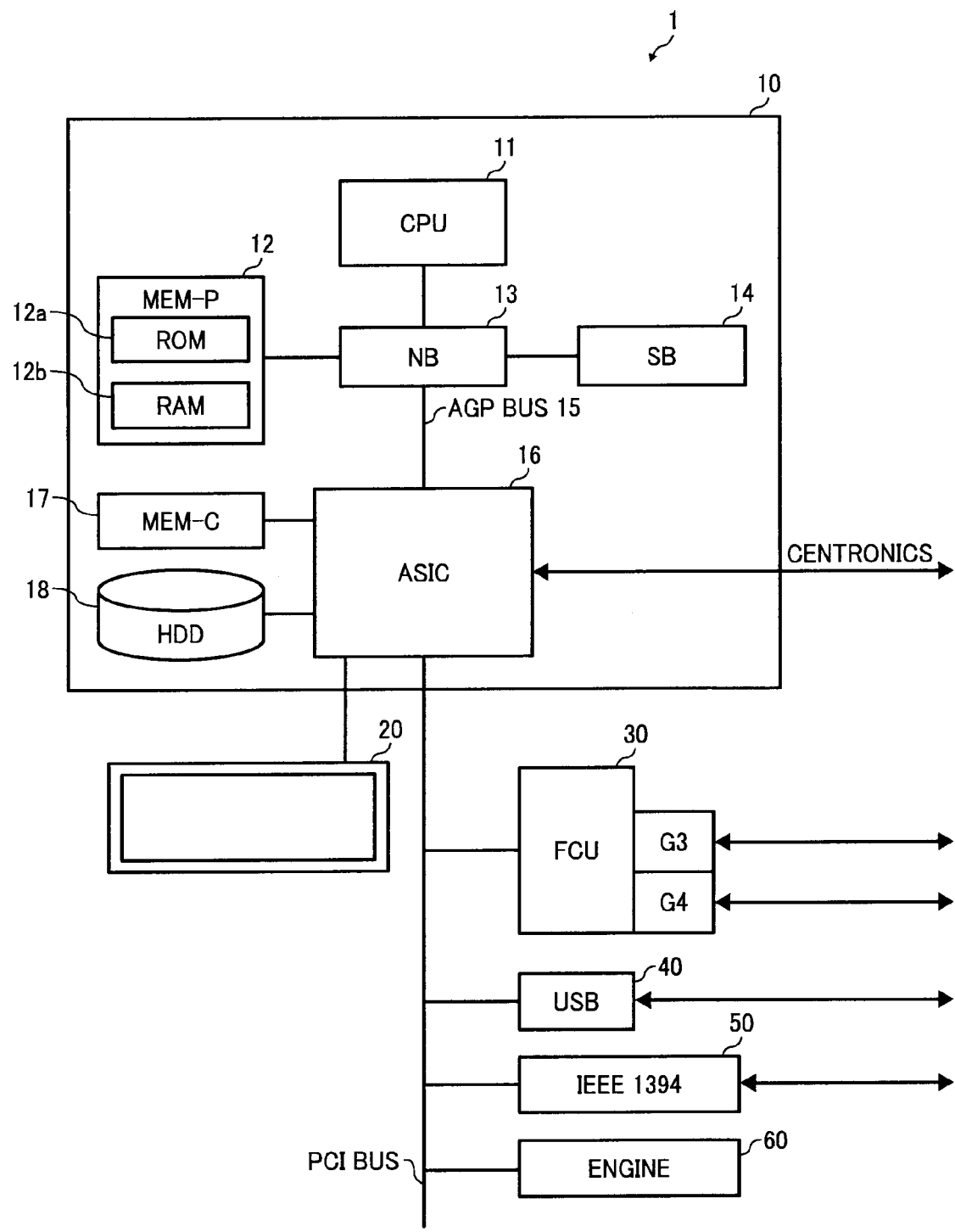
FIG. 14 is a view for explaining a hardware structure for a multifunction product.

The image reading device mounted with the motor drive device of this embodiment can also be a multifunction product that is an image forming apparatus. FIG. 14 is a view for explaining a hardware structure for a multifunction product. As shown in FIG. 14, a multifunction product 1 includes a controller 10 and an engine 60 connected by a Peripheral Component Interconnect (PCI) bus. The controller 10 is a controller that performs overall control of the multifunction product 1 and controls picture creation, communication, and input from an operation unit 20. The engine 60 is a printer engine connectable to a PCI bus, and can be, for example, a black and white plotter, a single drum color plotter, a four-drum color plotter, or a scanner or facsimile unit. In addition to a so-called engine portion such as a plotter, image processing such as for error diffusion and gamma transformation can also be included at the engine 60.

The controller 10 includes a CPU 11, a north bridge (NB) 13, a system memory (MEM-P) 12, a south bridge (SB) 14, a local memory (MEM-C) 17, an Application-Specific Integrated Circuit (ASIC) 16, and a hard disc drive (HDD) 18. The NB 13 and the ASIC 16 are connected by an Accelerated Graphics Port (AGP) bus 15.

The CPU 11 performs overall control of the multifunction product 1. The CPU 11 has a chip set including the MEM-P 12, the NB 13, and the SB 14, and is connected to other equipment via this chip set.

The NB 13 is a bridge for connecting the CPU 11, the MEM-P 12, the SB 14, and the AGP 15, and has a memory controller for controlling reading and writing of the MEM-P 12, a PCI master, and an AGP target.

The MEM-P 12 is system memory for use as memory for storing programs and data, memory for expanding programs and data, and memory for depicting pictures for a printer etc., and includes a ROM 12a and a RAM 12b. The ROM 12a is read-only memory for use as memory for storing programs and data. The RAM 12b is read-writable memory for use as memory for expanding programs and data and memory for depicting pictures for a printer.

The SB 14 is a bridge for connecting the NB 13 and PCI devices and peripheral devices. The SB 14 is connected to the NB 13 via the PCI bus. A network interface (I/F) unit etc. is also connected to the PCI bus.

The ASIC 16 is an IC (Integrated Circuit) for image processing having hardware elements for image processing and plays the role of a bridge connecting the AGP bus 15, the PCI bus, the HDD 18 and the MEM-C 17. The ASIC 16 includes a PCI target and AGP master, an arbiter (ARB) central to the ASIC 16, a memory controller that controls the MEM-C 17, a number of DMACs (Direct Memory Access Controllers) that perform rotation etc. of image data using hardware logic etc., and a PCI unit for transferring data to and from the engine 60 via the PCI bus. An FCU (Fax Control Unit) 30, a USB (Universal Serial Bus) 40, and an IEEE 1394 interface 50 are connected to the ASIC 16 via the PCI bus.

The MEM-C 17 is local memory used as an image buffer and code buffer for copy use. The HDD (Hard Disc Drive) 18 is storage that stores image data, programs, font data, and forms.

The AGP 15 is a bus interface for graphics accelerator card use proposed in order to increase the speed of graphics processing. High-speed can then be achieved with a graphics accelerator card by then directly accessing the MEM-P 12 at a high throughput.

The motor drive control program executed by the motor drive device of this embodiment is supplied in advance in a ROM etc.

The motor drive control program executed by the motor drive device of this embodiment can also be provided recorded on a recording medium readable by a computer such as a CD-ROM, flexible disc (FD), CD-R, or DVD (Digital Versatile Disk) as installable or executable files.

The motor drive control program executed by the motor drive device of this embodiment can also be provided stored on a computer connected to a network such as the Internet or can also be downloaded via a network. The motor drive control program executed by the motor drive device of this embodiment can be supplied or distributed via a network such as the Internet.

The motor drive control program executed by the motor drive device of this embodiment can be made from a module containing each part (the motor control unit, the control-pattern acquiring unit, the setting information acquirer, the motor control data generator, etc.). Each part can then be loaded into the main storage device by a CPU (processor) that is actual hardware reading and executing the motor drive control program from the ROM. The motor control unit, control-pattern acquiring unit, setting information acquirer, and motor control data generator etc. are then created on the main storage device.

The motor control unit can also be hardware such as a control circuit rather than being software.

The present invention is by no means limited to the above embodiment. Other aspects of the present invention are explained in a second and a third embodiments of the present invention.

The following is an explanation with reference to the appended drawings of the second embodiment. The motor drive device of the second embodiment exerts control so that the rotor stops in positions corresponding to excitation modes set in advance while stopping the stepping motor.

Figure 15:
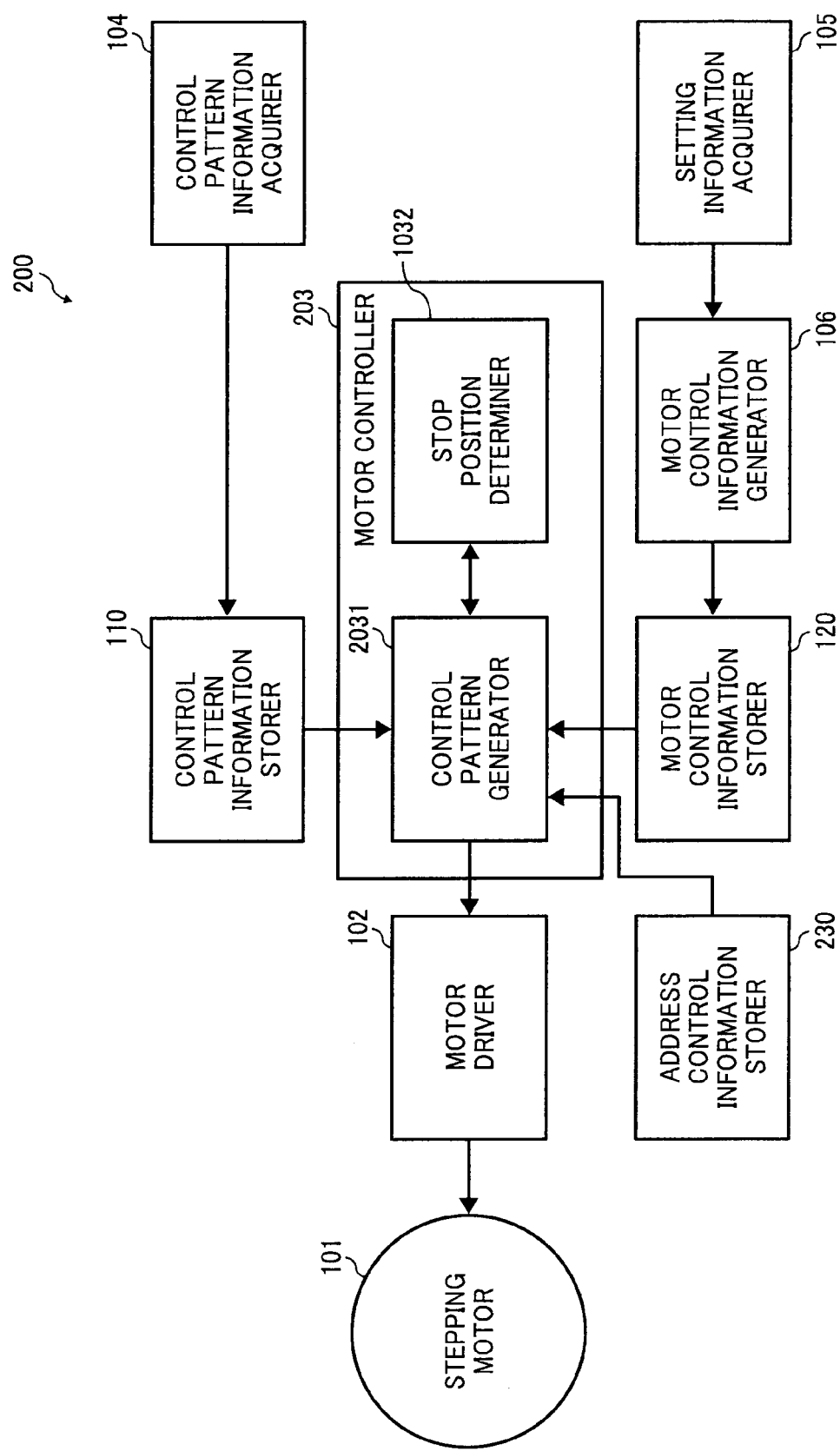
FIG. 15 is a block view of a structure for a motor drive device of a second embodiment.

An explanation is given of parts of an example structure for a motor drive device to which the present invention is applied that differ from the first embodiment. Other parts are the same as for the first embodiment, are referenced above, and are not described here. FIG. 15 is a block view of a structure for a motor drive device of the second embodiment.

A motor drive device 200 according to the second embodiment includes a stepping motor 101, a motor driver 102, a motor controller 203, a control pattern information acquirer 104, a setting information acquirer 105, a motor control information generator 106, a control pattern information storer 110, a motor control information storer 120, and an address control information storer 230.

The structure and functions of the stepping motor 101, the motor driver 102, the control pattern information acquirer 104, the setting information acquirer 105, the motor control information generator 106, the control pattern information storer 110 and the motor control information storer 120 are the same as for the first embodiment and are not described here.

The address control information storer 230 stores control information used while controlling addresses. FIG. 16 is a view explaining an example data structure for the address control information storer 230 and obtained values. As shown in FIG. 16, respective values for next address designation method, add/subtract address value, stop excitation mode, stop position, and stopping direction are installed in the address control information storer 230.

For example, when "fixed" is set to the next address designation method, a fixed address is added in accordance with the excitation mode as in the first embodiment and is set as the next address. On the other hand, when "specified" is set, an add/subtract address value set at the add/subtract address value is added/subtracted to/from the previous address and the result is set as the next address. The details are explained later.

Further, when "2 phase" is set as the stop excitation mode, the rotor is stopped at a position corresponding to the two-phase excitation mode as in the first embodiment. When "5" is set at the stop position, the rotor is stopped at position (5). When the stop direction is set to "forward rotation" and excitation mode is set to the stop excitation mode, forward rotation takes place and stopping takes place at a position corresponding to the set excitation mode. In this embodiment, it is possible not only for stopping to take place at positions corresponding to the two-phase excitation mode as in the first embodiment, but also for the rotor to be stopped at set positions and at positions corresponding to the set excitation mode.

The motor controller 203 includes a control pattern generator 2031 and the stop position determiner 1032. The structure and function of the stop position determiner 1032 are the same as for the first embodiment and are not described. In addition to the functions and structure explained for the first embodiment, the control pattern generator 2031 sends a position flag to the stop position determiner 1032 while sending a control pattern corresponding to the stop excitation mode and stop position stored in the address control information storer 230 to the motor driver 102. The stop position determiner 1032 determines the stop position using the received position flag as in the first embodiment.

Figure 17B:
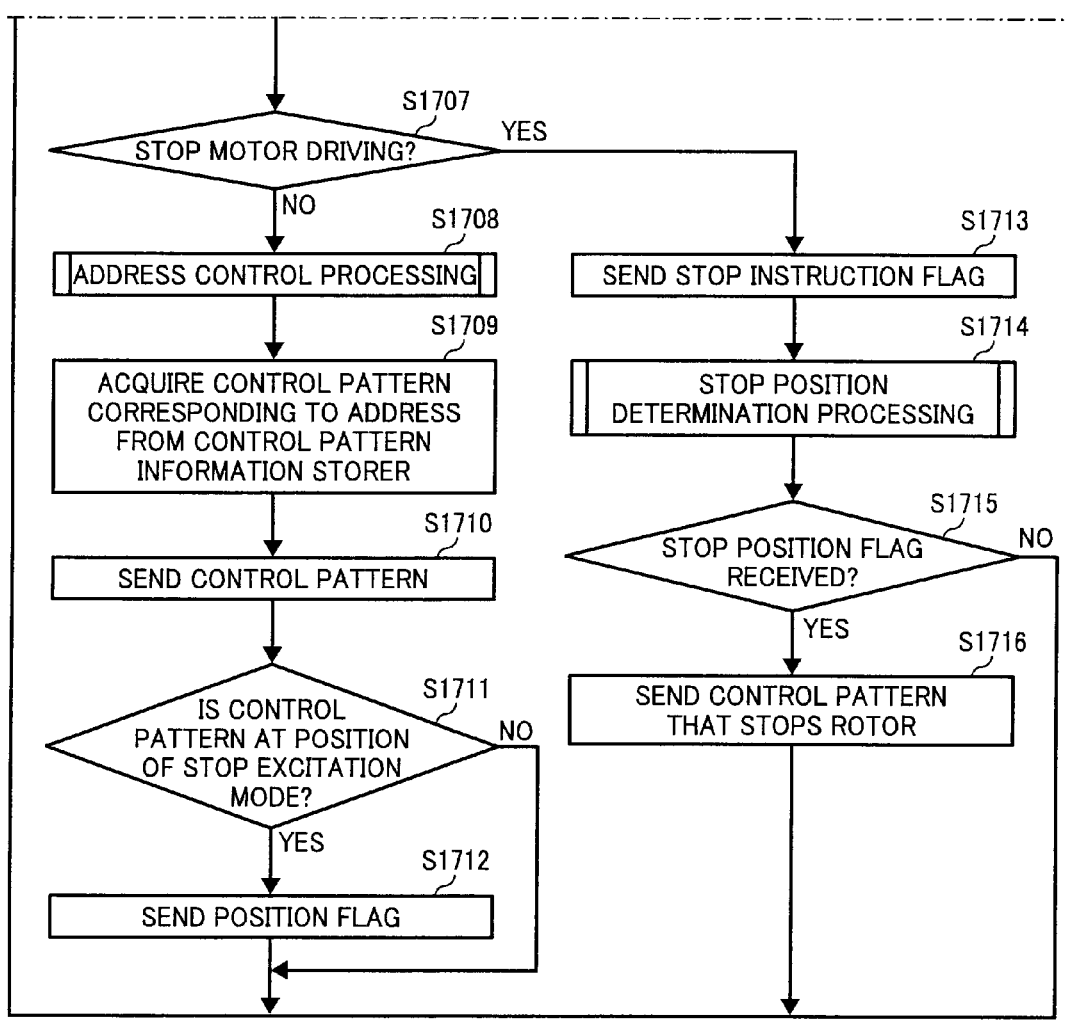
FIG. 17 is a flowchart of a motor drive control processing procedure carried out by the motor control unit.

Next, motor drive control processing by the motor control unit of the above structure is explained. FIG. 17 is a flowchart of a motor drive control processing procedure carried out by the motor control unit. The motor drive control processing procedure of this embodiment is substantially the same as the flowchart of FIG. 8 and only different portions are explained.

Step S1701 to Step S1703, Step S1705 to Step S1710, and Step S1713 to Step S1716 are referred to in the explanation of FIG. 8 and are not described here.

In Step S1704, the control pattern generator 2031 acquires address information stored in the address control information storer 230 (Step S1704). For example, when "specified" is taken the next address within the address control information, a number of numeric values are taken as add/subtract address values corresponding to the respective addresses, "two-phase" is taken as the stop excitation mode, and "forward rotation" is stored in the "stop direction", the respective values are acquired. The acquired respective values are then used in address control processing and stop position determination processing explained later.

In Step S1711, the control pattern generator 2031 determines whether the control pattern is a control pattern that controls the rotor to move to a position corresponding to the stop excitation mode (Step S1711). When a control pattern that controls the rotor to move to a position corresponding to the stop excitation mode is determined (Yes at Step S1711), a position flag is sent to the stop position determiner 1032 (Step S1712). When a control pattern is determined not to be a control pattern that controls the rotor to move to a position corresponding to the stop excitation mode (No at Step S1711), Step S1705 is returned to.

It is therefore possible for a user to stop the rotor at a position corresponding to the desired excitation mode by sending a position flag in the case of control to move the rotor to a position corresponding to stop excitation mode.

In Step S1711, it is possible to determine whether the control pattern is a control pattern that controls the rotor to move to a position, for example, position (5), set to a position within the address control information, instead of a position corresponding to stop excitation mode. It is then possible to stop the rotor at a stop position desired by the user.

Figure 18:
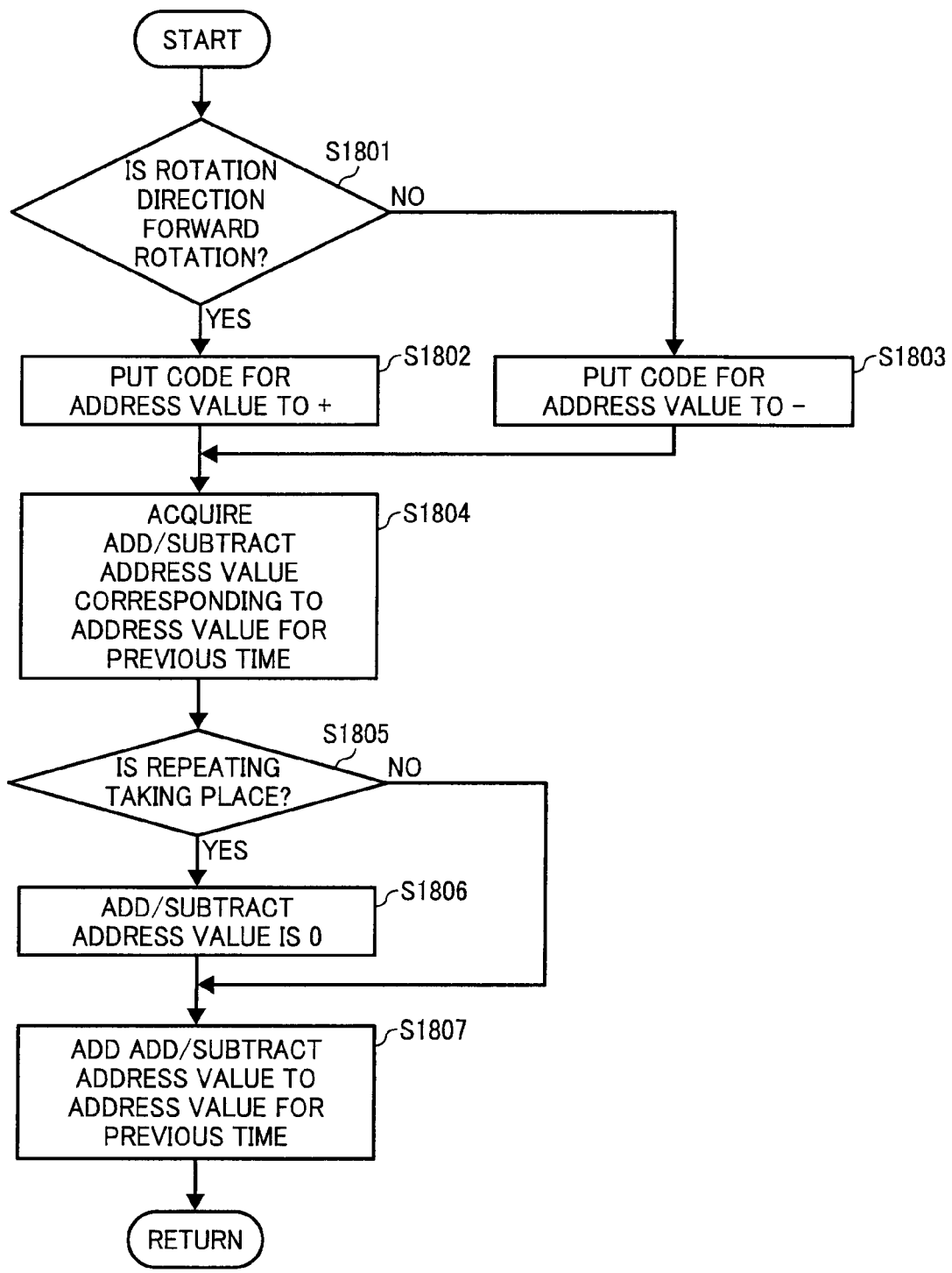
FIG. 18 is a flowchart of an address control processing procedure carried out by the control pattern generator.

Next, address control processing is explained. FIG. 18 is a flowchart of an address control processing procedure carried out by the control pattern generator.

First, the control pattern generator 2031 determines whether the acquired rotation direction is "forward rotation" (Step S1801). When it is determined that the acquired rotation direction is "forward rotation" (Yes at Step S1801), the code for the add/subtract address value is put to "+" (Step S1802). When it is determined that the acquired rotation direction is not "forward rotation", i.e. is "reverse rotation" (No at Step S1801), the code for the add/subtract address value is put to "−" (Step S1803).

The control pattern generator 2031 then acquires an add/subtract address value corresponding to an address value for the previous time from the address control information storer 230 (Step S1804). The control pattern generator 2031 determines whether repeating is taking place (Step S1805). When it is determined that repeating is taking place (Yes at Step S1805), the add/subtract address value is taken to be "0" (Step S1806). Step S1807 is processed when it is determined that repeating is not taking place (No at Step S1805). The control pattern generator 2031 then adds the add/subtract address value to the address value for the previous time and calculates the address value for this time (Step S1807).

The motor is therefore driven by controlling the position the rotor is moved to in accordance with add/subtract address values set by the user rather than adding/subtracting offset values decided corresponding to the excitation mode. Driving of the motor can therefore be controlled in a more flexible manner.

Figure 19:
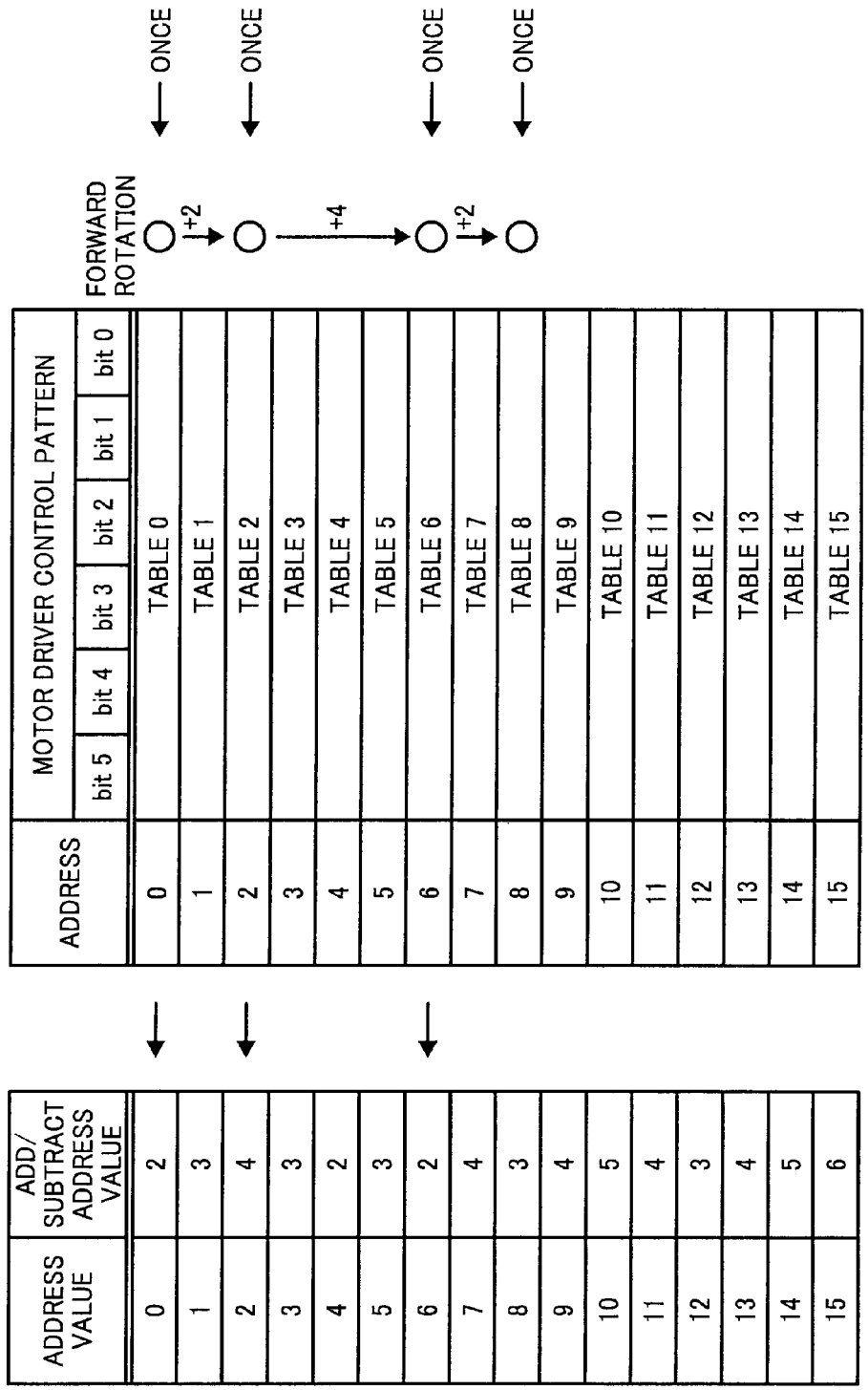
FIG. 19 is a view of an example of address control.

FIG. 19 is a view of an example of address control. The flow of address control processing for the case where add/ subtract address values are stored as shown in FIG. 19 is explained using FIG. 18. In this example, the rotation direction is "forward rotation" the excitation mode is "two-phase", and the repeat number is "one time".

First, the control pattern generator 2031 determines that the acquired rotation direction is "forward rotation" (Yes at Step S1801:), the code for the add/subtract address value is put to "+" (Step S1802). When the address value for the previous time is "0", the control pattern generator 2031 acquires the add/subtract address value "2" corresponding to the address "0" for the previous time from the add/subtract address (Step S1804).

The control pattern generator 2031 determines that repeating is not taking place because the repeat number is "one time" (No at Step S1805), and Step S1807 is proceeded to. The control pattern generator 2031 then adds the add/subtract address value "2" to the address value for the previous time "0" and calculates the address "2" for this time (Step S1807). The control pattern table "2" corresponding to the address "2" is then acquired from the control pattern information storer 110 and control is exerted to move the rotor to position (2). Similarly, an add/subtract address value corresponding to the address value is added to the previous address and the next address is calculated. Address control is then carried out in the same manner thereafter.

Next, stop position determining processing of the second embodiment is explained. The stop position determining processing is substantially the same as for the first embodiment, and only points of difference are explained here with reference to FIG. 11.

When the rotor is positioned in a position corresponding to the two-phase excitation mode of the first embodiment, rather than sending a position flag, in this embodiment, a position flag is sent when the rotor is moved to a position corresponding to the excitation mode stored as the stop excitation mode. When a position flag is received after receiving a stop instruction flag, the stop position determiner 1032 takes a position corresponding to the position flag as a stop position and sends the stop position flag to the control pattern generator 2031.

As a result, it is possible to stop the rotor at a position corresponding to an arbitrary excitation mode and the stop position of the rotor is therefore not indeterminate.

FIG. 20 is a view of an example of the relationship between the current operation excitation mode and the stop excitation mode. As depicted in FIG. 20, the excitation mode operating with a rotation direction of "forward rotation" is "W1-2 phase". The position the rotor moves to is therefore position (0) to (15). Position flags are also sent at positions (0), (4), (8), and (12) because the stop excitation mode is "two-phase". As shown in FIG. 20, when a stop instruction flag is sent at position (9), a stop position flag is sent at position (12) where a position flag is sent afterwards, and the rotor is stopped at position (12).

Figure 21:
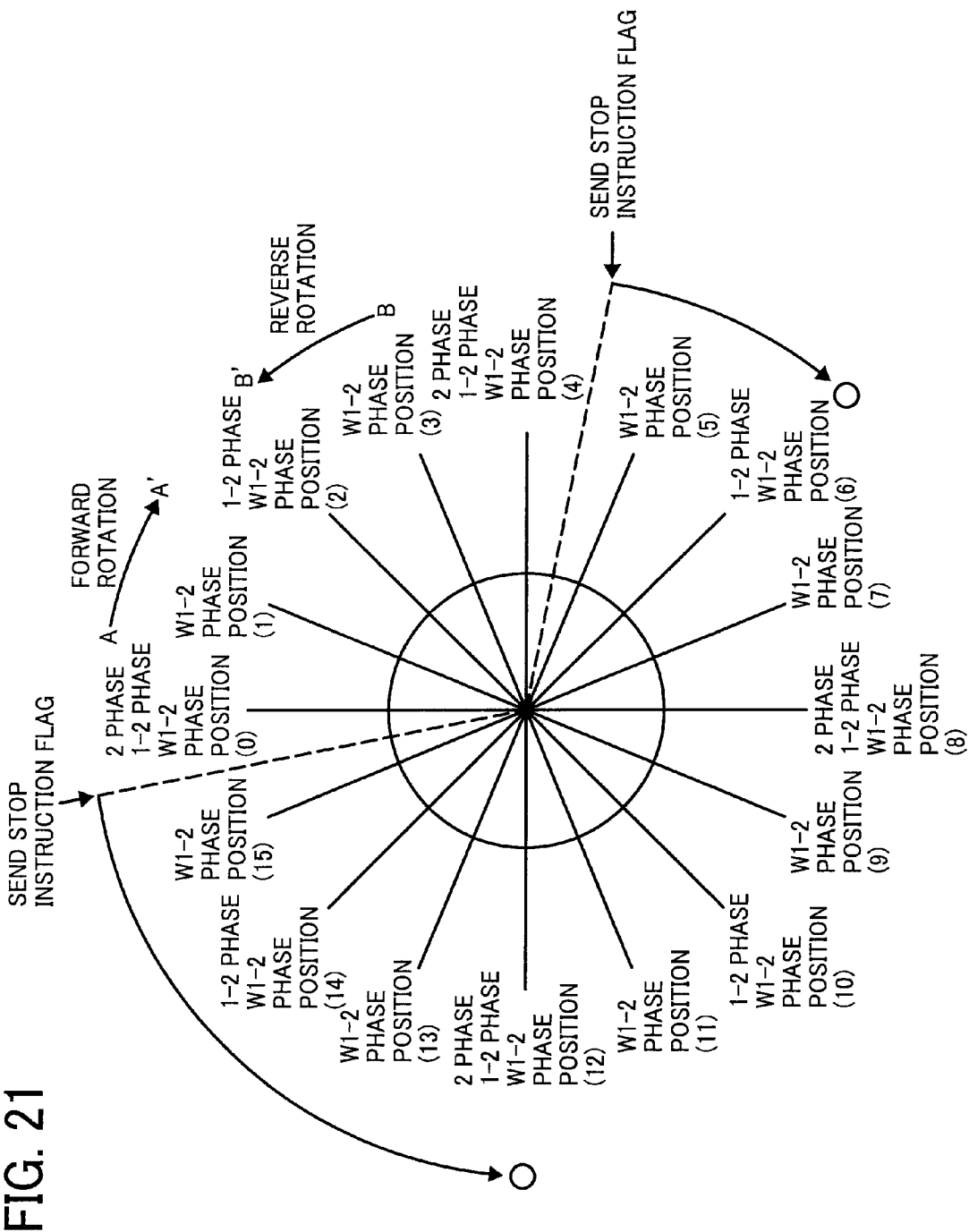
FIG. 21 is a view explaining an example of the relationship between the position of the stator of the stepping motor, the stop instruction flag, and the stopping position.

FIG. 21 is a view explaining an example of the relationship between the position of the stator of the stepping motor, the stop instruction flag, and the stop position. For example, when the rotation direction is "forward rotation", the operating excitation mode is "W1-2-phase", and the stop excitation mode is "1-2-phase", when the position flag is sent at a position corresponding to stop excitation mode "1-2 phase", and a stop instruction flag is sent between positions (4) and (5), the stop position flag is sent at the position (6) that is the closest 1-2 phase position in forward rotation and the rotor is stopped at position (6).

Further, when the rotation direction is "reverse rotation", the operating excitation mode is "W1-2-phase", and the stop excitation mode is "2 phase", when the position flag is sent at a position corresponding to stop excitation mode "2 phase", and a stop instruction flag is sent between positions (0) and (15), the stop position flag is sent at the position (12) that is the closest 2-phase position in reverse rotation and the rotor is stopped at position (12).

The following is an explanation with reference to the appended drawings of the third embodiment. The motor drive device of the third embodiment exerts control so that the rotor stops in positions corresponding to excitation modes driving the stepping motor next while stopping the stepping motor.

Figure 22:
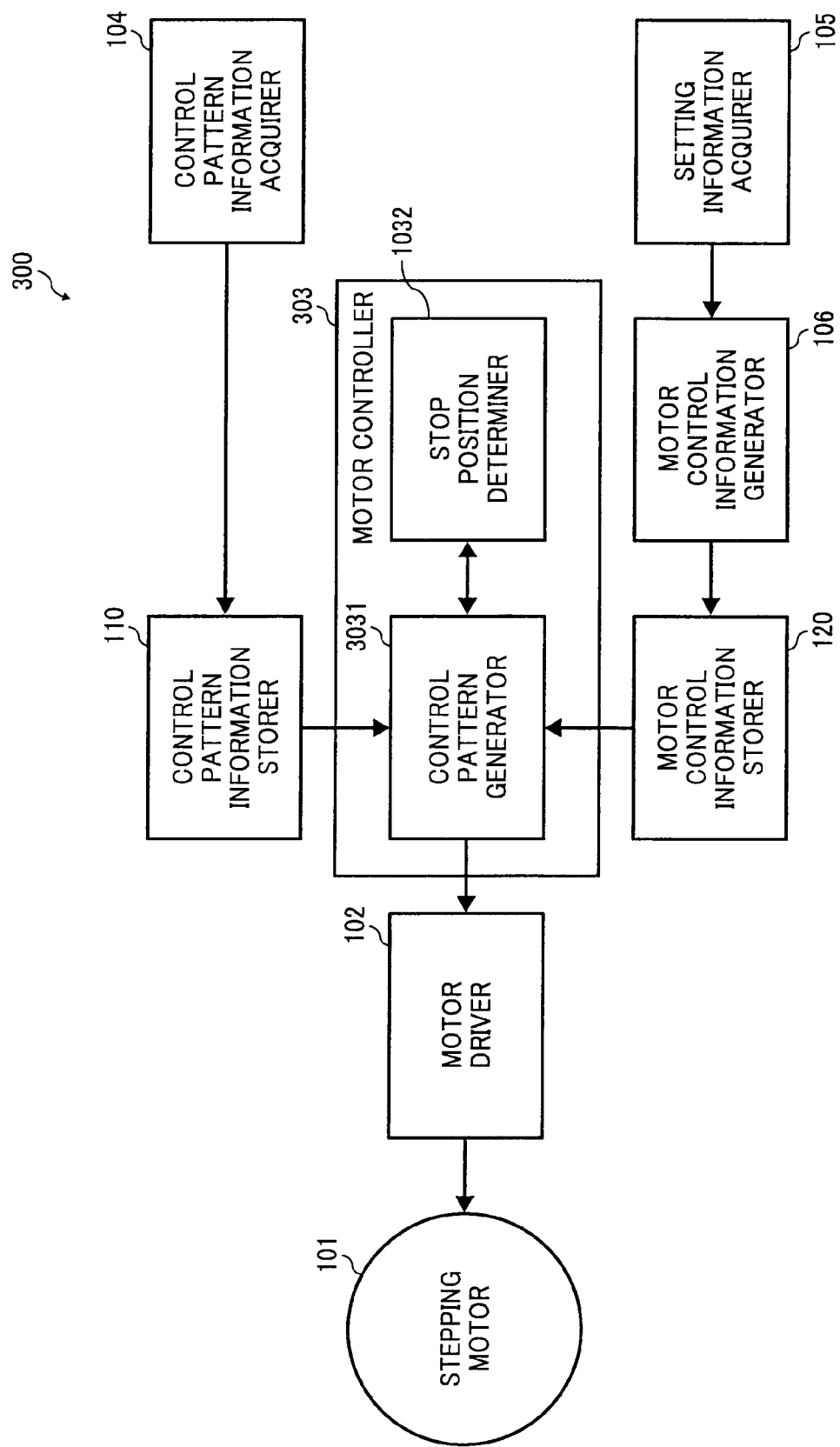
FIG. 22 is a block view of a structure for a motor drive device of a third embodiment.

An example structure for the motor drive device of this embodiment is explained for portions differing to the first embodiment. Other parts are the same as for the first embodiment, are referenced above, and are not described here. FIG. 22 is a block view of a structure for a motor drive device of the third embodiment.

A motor drive device 300 according to the third embodiment includes a stepping motor 101, a motor driver 102, a motor controller 303, a control pattern information acquirer 104, a setting information acquirer 105, a motor control information generator 106, a control pattern information storer 110 and a motor control information storer 120. The structure and functions of the stepping motor 101, the motor driver 102, the control pattern information acquirer 104, the setting information acquirer 105, the motor control information generator 106, the control pattern information storer 110 and the motor control information storer 120 are the same as for the first embodiment and are not described here.

The motor controller 303 includes a control pattern generator 3031 and the stop position determiner 1032. The structure and function of the stop position determiner 1032 are the same as for the first embodiment and are not described.

In addition to the functions and structure explained for the first embodiment, the control pattern generator 3031 sends a position flag to the stop position determiner 1032 while sending a control pattern corresponding to a position corresponding to the excitation mode operated at next stored in the motor control information storer 120 to the motor driver 102. It is then possible to determine a position corresponding to the excitation mode operated at next as the stop position at the stop position determiner 1032.

Figure 23:
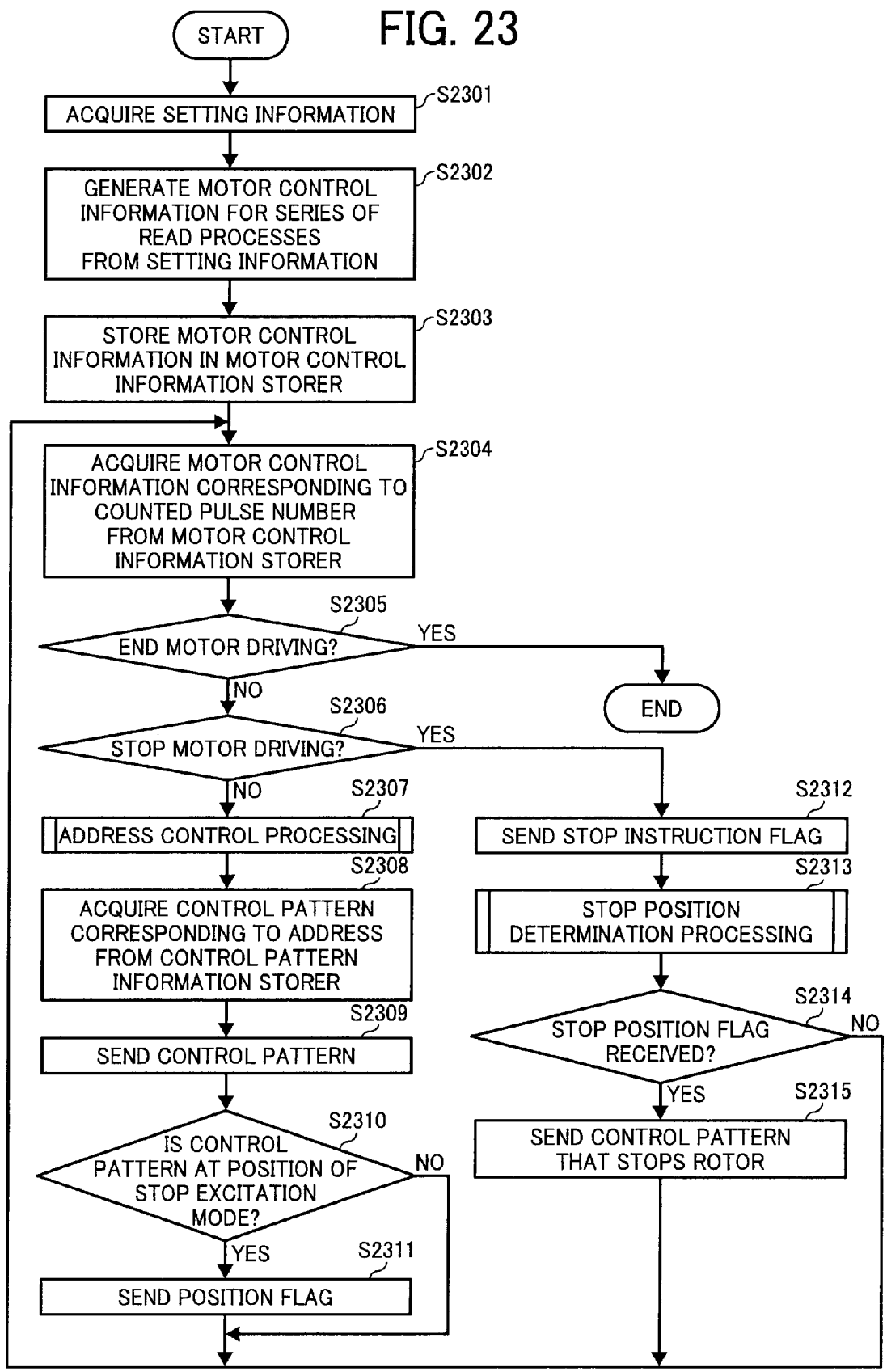
FIG. 23 is a flowchart of a motor drive control processing procedure carried out by the motor control unit.

Next, motor drive control processing by the motor control unit of the above structure is explained. FIG. 23 is a flowchart of a motor drive control processing procedure carried out by the motor control unit. The motor drive control processing procedure of this embodiment is substantially the same as the flowchart of FIG. 8 and only different portions are explained. Step S2301 to Step S2309, and Step S2312 to Step S2315 are referred to in the explanation of FIG. 8 and are not described here.

In Step S2310, the control pattern generator 3031 determines whether the control pattern sent to the motor driver 102 is for a position corresponding to the excitation mode to be operated next (Step S2310). For example, when the excitation mode to operate next is "1-2 phase", it is determined whether the position is any of the positions (0), (2), (4), (6), (8), (10), (12), (14). When it is determined that the control pattern is for a position corresponding to the excitation mode operated at next (Yes at Step S2310), a position flag is sent to the stop position determiner 1032 (Step S2311). When it is determined that the control pattern is not for a position corresponding to the excitation mode operated at next (Step S2310: No), Step S2304 is returned to.

When the rotor is moved to a position corresponding to the excitation mode operated at next, the rotor can be stopped at a position corresponding to the excitation mode operated at next because a position flag is sent. The extent of movement of the rotor when the motor moves again is therefore not indeterminate and images can therefore be read in a highly precise manner without distortion occurring in the read images.

An explanation is given for the first to third embodiments of the present invention above but various modifications and improvements of the above embodiments are possible. Further, the structures and functions explained for the first to third embodiments can also be freely combined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor drive device that drives a stepping motor having a rotor mounted on a rotating shaft with a capability of making a transition between a plurality of excitation modes, the motor drive device comprising:
   a motor control unit that drives the stepping motor by controlling the rotor to move to a position corresponding to one of the excitation modes;
   a stop control unit that controls, when stopping the stepping motor, the rotor to stop at a position to which the rotor is moved by the motor control unit that is common to the plurality of excitation modes after being instructed to stop the rotor; and
   a stop-excitation-mode storing unit that stores therein an excitation mode corresponding to the position at which the rotor stops,
   wherein when the stop control unit is instructed to move the rotor to a position corresponding to the excitation mode stored in the stop-excitation-mode storing unit, the stop control unit sends a position flag indicating that the rotor is controlled to move to the position corresponding to the excitation mode stored in the stop-excitation-mode storing unit, and
   the stop control unit sends a position flag indicating that the rotor is moved to a two-phase position every time controlling the rotor to be moved to the two-phase position, and when controlling the rotor to stop, sends a stop instruction flag instructing a stop of the rotor, determines, after sending the stop instruction flag, a position from which the position flag indicating that the rotor is moved to the two-phase position is sent, to be the position at which the rotor stops, and controls the rotor to stop at the position at which the rotor stops.

2. The motor drive device according to claim 1, wherein the stop-excitation-mode storing unit further stores therein a rotation direction indicating a direction of rotation of the rotor, and
   when the stop control unit is instructed to move the rotor to the position corresponding to the excitation mode stored in the stop-excitation-mode storing unit in accordance with the rotation direction stored in the stop-excitation-mode storing unit, the stop control unit sends the position flag indicating that the rotor is controlled to move to the position corresponding to the excitation mode stored in the stop-excitation-mode storing unit.

3. A motor drive device that drives a stepping motor having a rotor mounted on a rotating shaft with a capability of making a transition between a plurality of excitation modes, the motor drive device comprising:
   a motor control unit that drives the stepping motor by controlling the rotor to move to a position corresponding to one of the excitation modes;
   a stop control unit that controls, when stopping the stepping motor, the rotor to stop at a position to which the rotor is moved by the motor control unit that is common to the plurality of excitation modes after being instructed to stop the rotor; and
   a stop-position storing unit that stores therein the position at which the rotor stops,
   wherein when the stop control unit is instructed to move the rotor to the position stored in the stop-position storing unit, the stop control unit sends a position flag indicating that the rotor is controlled to move to the position stored in the stop-position storing unit, and
   the stop control unit sends a position flag indicating that the rotor is moved to a two-phase position every time controlling the rotor to be moved to the two-phase position, and when controlling the rotor to stop, sends a stop instruction flag instructing a stop of the rotor, determines, after sending the stop instruction flag, a position from which the position flag indicating that the rotor is moved to the two-phase position is sent, to be the position at which the rotor stops, and controls the rotor to stop at the position at which the rotor stops.

4. An image reading device that reads a document by driving an image reading unit using the stepping motor controlled by the motor control device according to claim 3.

5. An image forming apparatus comprising:
   the image reading device according to claim 4; and
   an image processing device that performs an image processing of image information read by the image reading device.

6. A motor drive device that drives a stepping motor having a rotor mounted on a rotating shaft with a capability of making a transition between a plurality of excitation modes, the motor drive device comprising:
   a motor control unit that drives the stepping motor by controlling the rotor to move to a position corresponding to one of the excitation modes;
   a stop control unit that controls, when stopping the stepping motor, the rotor to stop at a position to which the rotor is moved by the motor control unit that is common to the plurality of excitation modes after being instructed to stop the rotor; and
   a motor-control-information storing unit that stores therein an excitation mode for controlling rotation of the rotor in a transition order,
   wherein when the stop control unit is instructed to move the rotor to a position corresponding to the excitation mode to be operated next stored in the motor-control-information storing unit, the stop control unit sends a position flag indicating that the rotor is controlled to move to the position corresponding to the excitation mode to be operated next, and
   the stop control unit sends a position flag indicating that the rotor is moved to a two-phase position every time controlling the rotor to be moved to the two-phase position, and when controlling the rotor to stop, sends a stop instruction flag instructing a stop of the rotor, determines, after sending the stop instruction flag, a position from which the position flag indicating that the rotor is moved to the two-phase position is sent, to be the position at which the rotor stops, and controls the rotor to stop at the position at which the rotor stops.

7. The motor drive device according to claim 6,
   wherein the motor-control-information storing unit stores therein a rotation direction indicating a direction of rotation of the rotor in association with the excitation mode stored in the motor-control-information storing unit, and when the stop control unit is instructed to move the rotor to the position corresponding to the excitation mode to be operated next stored in the motor-control-information storing unit in accordance with the rotation direction stored in the motor-control-information storing unit, the stop control unit sends the position flag indicating that the rotor is controlled to move to the position corresponding to the excitation mode to be operated next.

8. A motor drive device that drives a stepping motor having a rotor mounted on a rotating shaft with a capability of making a transition between a plurality of excitation modes, the motor drive device comprising:
 a motor control unit that drives the stepping motor by controlling the rotor to move to a position corresponding to one of the excitation modes;
 a stop control unit that controls, when stopping the stepping motor, the rotor to stop at a position to which the rotor is moved by the motor control unit that is common to the plurality of excitation modes after being instructed to stop the rotor;
 a control-pattern storing unit that stores therein an address corresponding to a position to which the rotor moves in association with a control pattern for driving the stepping motor by moving the rotor to the position to which the rotor moves;
 an address acquiring unit that acquires a next address corresponding to a position to which the rotor moves next by adding an offset value corresponding to the excitation mode to the address; and
 a control-pattern acquiring unit that acquires a control pattern corresponding to the next address acquired by the address acquiring unit from the control-pattern storing unit,
 wherein the motor control unit controls the rotor to move to the position to which the rotor moves next by sending the control pattern acquired by the control-pattern acquiring unit to the motor driver.

9. The motor drive device according to claim 8, wherein the control-pattern storing unit further stores therein an add/subtract address value corresponding to the address, and
 the address acquiring unit acquires the next address corresponding to the position to which the rotor moves next by adding the add/subtract address value stored in association with a previous address to the previous address.

10. The motor drive device according to claim 8, further comprising:
 a motor-control-information storing unit that stores therein a repeat count that is a number of times the rotor stops in an identical position in association with the excitation mode,
 wherein the motor control unit controls the position to which the rotor moves by sending the control pattern acquired by the control-pattern acquiring unit in accordance with the repeat count stored in the motor-control-information storing unit.

11. The motor drive device according to claim 8, wherein the control-pattern storing unit is stored in a readable/writable storage unit.

12. A motor drive method for driving a stepping motor having a rotor mounted on a rotating shaft with a capability of making a transition between a plurality of excitation modes, the motor drive method comprising:
 driving the stepping motor by controlling the rotor to move to a position corresponding to one of the excitation modes;
 controlling, when stopping the stepping motor, the rotor to stop at a position to which the rotor is moved at the driving that is common to the plurality of excitation modes after an instruction to stop the rotor is issued;
 storing the position at which the rotor stops;
 sending, when controlling the rotor to move to the position stored in the storing, a position flag indicating that the rotor is controlled to move to the position stored in the storing; and
 sends a position flag indicating that the rotor is moved to a two-phase position every time controlling the rotor to be moved to the two-phase position; and
 sending, when controlling the rotor to stop, a stop instruction flag instructing a stop of the rotor, determining, after sending the stop instruction flag, a position from which the position flag indicating that the rotor is moved to the two-phase position is sent, to be the position at which the rotor stops, and controlling the rotor to stop at the position at which the rotor stops.

* * * * *